(12) United States Patent
Hantschel et al.

(10) Patent No.: US 8,902,221 B2
(45) Date of Patent: Dec. 2, 2014

(54) PROSPECT ASSESSMENT AND PLAY CHANCE MAPPING TOOLS

(75) Inventors: Thomas Hantschel, Aldenhoven (DE); Alexander Martin Wilson, London (GB); Nicola Tessen, Aachen (DE); Glenn Koller, Tulsa, OK (US); Martin Neumaier, Herzogenrath (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

(21) Appl. No.: 13/271,829

(22) Filed: Oct. 12, 2011

(65) Prior Publication Data

US 2012/0316847 A1    Dec. 13, 2012

Related U.S. Application Data

(63) Continuation of application No. 13/271,755, filed on Oct. 12, 2011.

(60) Provisional application No. 61/495,584, filed on Jun. 10, 2011.

(51) Int. Cl.
*G06T 15/00* (2011.01)
*G06Q 50/02* (2012.01)
*G06Q 10/00* (2012.01)

(52) U.S. Cl.
CPC ............... *G06Q 10/00* (2013.01); *G06Q 50/02* (2013.01)
USPC ............... 345/419; 345/418; 345/441; 702/6; 702/14; 702/16

(58) Field of Classification Search
CPC ..................................................... E21B 44/00
USPC .................. 345/418, 419, 441; 702/6, 14, 16
See application file for complete search history.

(56) References Cited

U.S. PATENT DOCUMENTS 6,549,854 B1 * 4/2003 Malinverno et al. ............ 702/16
6,612,382 B2 * 9/2003 King .................................. 175/40

(Continued)

FOREIGN PATENT DOCUMENTS

WO    2010/002975 A1    1/2010

OTHER PUBLICATIONS

Malvic, Stochastical approach in deterministic calculation of geological risk—theory and example, NAFTA 60 (12) pp. 651-657, (2009).*

(Continued)

*Primary Examiner* — Phu K Nguyen
(74) *Attorney, Agent, or Firm* — Colin Wier; Rodney Warfford

(57) ABSTRACT

Prospect assessment and play chance mapping tools are provided. For assessing potential resources, example systems provide dynamically linked chance maps, transformed in real time from geological properties. Input geological maps or other data are dynamically linked to resulting chance maps, so that changes in the input maps automatically update the chance map in real time. Users can generate a custom risk matrix dynamically linking geological maps with chance maps via interface tools, dropping maps directly into the matrix. A transform may programmatically convert the geologic domain to the chance domain. The user can navigate input maps, select areas of interest, and drag-and-drop geologic properties into an uncertainty engine and distribution builder for uncertainty assessment based on geologic reality. A merge tool can programmatically unify multiple geological interpretations of a prospect. The merge tool outputs a single chance of success value for multiple geologic property values at each grid node.

20 Claims, 38 Drawing Sheets

(56) References Cited

U.S. PATENT DOCUMENTS

| | | | |
|---|---|---|---|
| 7,752,022 B2 * | 7/2010 | Fornel et al. | 703/10 |
| 7,869,955 B2 * | 1/2011 | Zhang et al. | 702/14 |
| 8,145,462 B2 * | 3/2012 | Foucault | 703/10 |
| 8,209,202 B2 * | 6/2012 | Narayanan et al. | 705/7.11 |
| 8,577,613 B2 * | 11/2013 | Bryant et al. | 702/6 |
| 2009/0198447 A1 | 8/2009 | Legendre et al. | |

OTHER PUBLICATIONS

Combined Search and Examination Report issued in United Kingdom No. GB1210122.6 on Oct. 9, 2012, 5 pages.

Notice of Acceptance to Australian Application No. 2012203388 dated Sep. 24, 2014 (2 pages).

* cited by examiner

PROPERTY TO CHANCE TRANSFORM 110

300

|   | % COS (0;1) 304 | POROSITY (%) 302 |
|---|---|---|
| 1 | 0.300 | 8 |
| 2 | 0.700 | 12 |

FIG. 3

PROSPECT ASSESSMENT AND PLAY CHANCE MAPPING TOOLS

CROSS-REFERENCE TO RELATED APPLICATION

This application claims the benefit of U.S. Provisional Patent Application 61/495,584 filed Jun. 10, 2011 entitled "Prospect Assessment And Play Chance Mapping Tools," the entirety of which is incorporated by reference herein.

BACKGROUND

A prospect includes an area of exploration in which hydrocarbons have been predicted to exist in economic quantity. A prospect may include an anomaly, such as a geologic structure or a seismic amplitude anomaly that is recommended by explorationists for drilling a well. Justification for drilling a prospect is made by assembling evidence for an active petroleum system, or reasonable probability of encountering reservoir-quality rock, a trap of sufficient size, adequate sealing rock, and appropriate conditions for the generation and migration of hydrocarbons to fill the trap. A single drilling location is also called a prospect, but the term is generally used in the context of exploration: exploration prospect assessment (EPA), hereinafter referred to as Prospect Assessment (PA).

A group of prospects of a similar nature constitutes a play. Thus, a play is a region in which hydrocarbon accumulations or prospects of a given type may occur: a conceptual model for a style of hydrocarbon accumulation used by explorationists to develop prospects in a basin, region, or trend and used by development personnel to continue exploiting a given trend. A play (or a group of interrelated plays) may occur in a single petroleum system.

Common Risk Segment Mapping (CRSM) is an exploration method to define areas of low exploration risk. Certain companies employ some method of play fairway mapping and common risk mapping. These may be used to define play Chance of Success (play COS) at the play level and local prospect Chance of Success (prospect COS) at the prospect level. "Traffic light" maps of red, yellow and green for high, moderate and low risk areas are examples of displays in the industry. CRSM maps that combine the geological elements that determine the Chance of Success of plays and prospects may be further combined with maps that delineate other risk elements that affect the overall prospectivity in an area, for example, distance from shore, water depth, accessibility to acreage, and so forth.

Play-based exploration may have a different focus than prospect-based exploration. Beyond the traffic light maps, there may be maps that show shared/play-specific and local/prospect-specific probabilities. A problem with these conventional probability and Chance of Success maps, however, may be the relative complexity of arriving at the map itself, such that if a geological condition changes, or when the explorationist changes a hypothetical or a geological property underpinning the map, the map has to be reconfigured and recalculated, which may be a conventionally painstaking process.

Play fairway mapping, common risk mapping, and Chance of Success mapping conventionally depend on numerous complex processes. The shear amount of input data through which the user may need to sort can make map creation difficult and sometimes non-intuitive. Additionally, there may be a lack of information on how to accomplish the exploration workflows. Easy-to-use tools may be needed to give fast results and simplify the clutter of inputting data for the process of creating the Chance of Success maps and evaluating the results.

SUMMARY

Prospect assessment and play chance mapping tools are provided. For exploration prospect assessment of potential hydrocarbon resources in a play or a prospect, an example system provides dynamically linked, real time risk, chance of success, and chance of failure maps ("chance maps"), transformed in real time from the geological properties of one or more input geological maps, play fairway maps, or other input data. The geological maps and data input to the system are dynamically linked to the resulting output: chance maps, so that a change to a geologic parameter of an input map or input datum automatically updates the chance map(s) in real time or near real time. In an example implementation, user-instigated changes in an example user interface are also instantly reflected in the resulting chance map. The example user interface allows the user to create and specify a custom hierarchical matrix of risk maps, including specifying dynamically linked input maps and data, and the dynamic links themselves. The user can specify sub-maps and sub-matrices to construct the main risk matrix, selecting and dropping maps directly into the matrix. A customizable transform quickly converts geologic properties from the geologic domain to the chance domain. The user interface also enables the user to navigate geological maps, draw a polygon around areas of interest (AOI) or otherwise select areas on a geologic map. After selecting an area, the user may drag-and-drop geologic properties within the polygon directly into an uncertainty engine that maps risk by applying an equation or by building a distribution to map uncertainty in a manner that is automatically tied directly back to geologic reality. A merge tool can apply a customizable formula to perform a programmatic merge of multiple grids that are modeling multiple different geological interpretations of a prospect. The merge tool outputs a single chance of success value for multiple geologic property values at each grid node.

This summary section is not intended to give a full description of prospect assessment and play chance mapping tools, or to provide a comprehensive list of features and elements. A detailed description with example implementations follows.

BRIEF DESCRIPTION OF THE DRAWINGS

FIG. 3 is a diagram of an example transform table.

DETAILED DESCRIPTION

Overview

This disclosure describes prospect assessment and play chance mapping tools. An example system streamlines information handling and provides a friendly and comprehensive user interface to construct custom risk matrices and dynamically link geological property maps and other input data to resulting chance maps and uncertainty assessments. The terms "chance" and "risk" are used somewhat interchangeable herein. Resulting chance (risk) maps may be live with real time automatic updating when there is a change, for example, when there is a change in a dynamically linked geological property map or a user-initiated change in a hypothetical parameter.

Example systems may thus provide dynamically linked chance maps, transformed in real time from geological properties and other input data. Users can generate a custom risk matrix dynamically linking geological maps with chance maps via comprehensive interface tools, for example, by dragging-and-dropping maps directly into the matrix. A customizable transform may programmatically convert the geologic domain to the chance domain. The user can navigate input maps, select areas of interest, and drag-and-drop geologic properties directly into an uncertainty engine and distribution builder for uncertainty assessment based directly on geologic reality. A merge tool can programmatically unify multiple geological interpretations (multiple maps) of the same prospect. The merge tool may output a single chance of success value at each grid node for multiple geologic property values at each corresponding grid node across the multiple grid maps.

Example Environment

Figure 1:
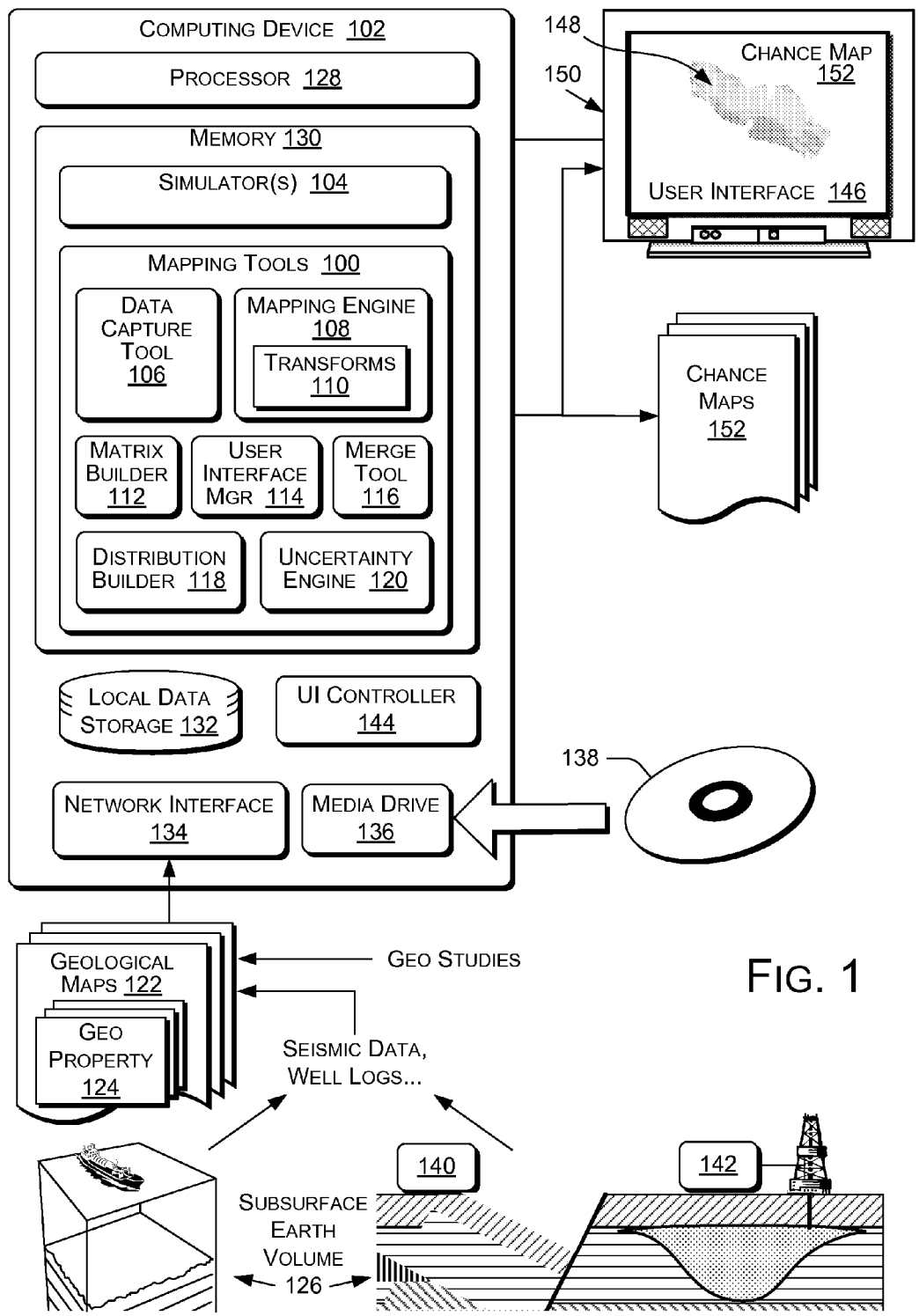
FIG. 1 is a block diagram of an example system and environment for prospect assessment and play chance mapping tools.

FIG. 1 shows an example system, providing an environment for prospect assessment and play chance mapping tools, such as mapping tools 100. A computing device 102 may implement components, such as simulators 104 and an example, representative set of the mapping tools 100. The simulators 104 may include seismic-to-simulation programs and software suites, geological simulators, reservoir simulators, oilfield modelers, and so forth. The example mapping tools 100 may include an example data capture tool 106, mapping engine 108, transforms 110, matrix builder 112, user interface manager 114, merge tool 116, distribution builder 118, uncertainty engine 120, and other modules: for exploration and geological prospecting, risk mapping, chance of success (or failure) studies and mapping, resource and site assessment, etc. The mapping tools 100 are illustrated as software, but can be implemented as hardware or as a combination of hardware, and software instructions. The illustrated set of mapping tools 100 is provided as an example for the sake of description, other mapping tools, or other configurations of the mapping tools 100 can also be used.

In the illustrated example, the computing device 102 receives geologic maps 122 and other data as input. One or more of the geologic maps 122 may show at least one geological property 124 and may be communicatively coupled via sensory and control devices with real-world subsurface earth volumes 126, i.e., underground plays including petroleum reservoirs, depositional basins, seabeds, oilfields, wells, etc., as well as surface control networks, and so forth. A subsurface earth volume 126 being modeled may be a candidate for petroleum production, or for water resource management, carbon services, or other uses.

The computing device 102 hosting the mapping tools 100 may be a computer, computer network, or other device that has a processor 128, memory 130, data storage 132, and other associated hardware such as a network interface 134 and a media drive 136 for reading and writing a removable storage medium 138. The removable storage medium 138 can be, for example, a compact disk (CD); digital versatile disk/digital video disk (DVD); flash drive, etc.

Figure 36:
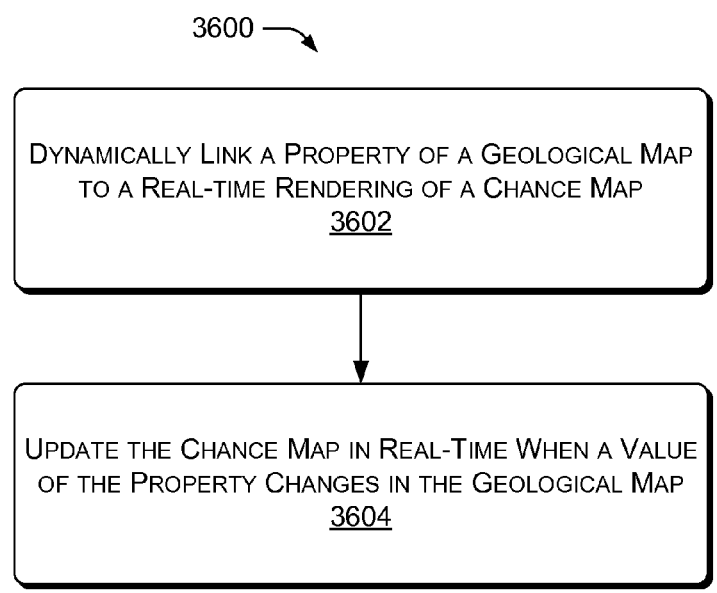
FIG. 36 is a flow diagram of an example method of creating a live chance of success map.
Figure 37:
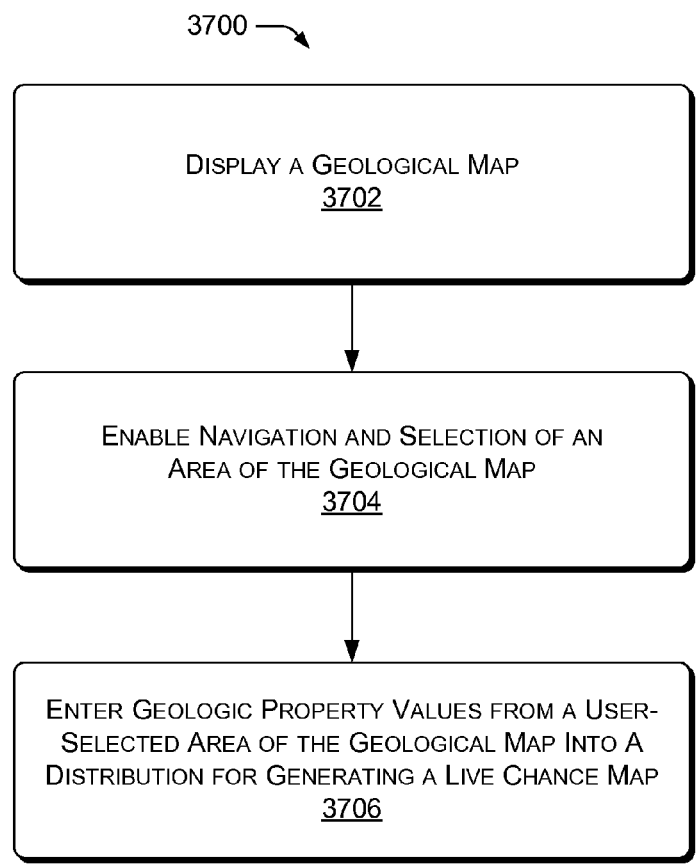
FIG. 37 is a flow diagram of an example method of capturing geological properties to generate a live chance of success map.
Figure 38:
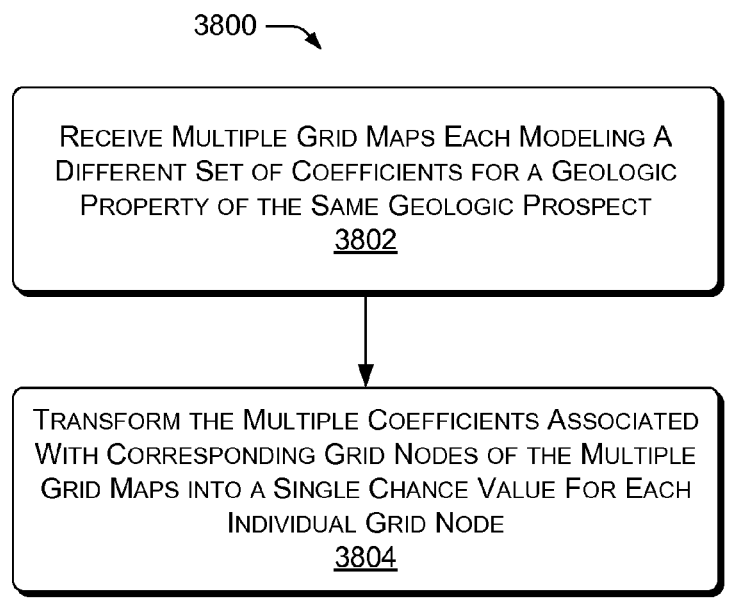
FIG. 38 is a flow diagram of an example method of merging multiple geological grids into a single grid of chance of success values.

The removable storage medium 138 may include instructions for implementing and executing the example mapping tools 100 and associated computer-executable methods (e.g., see FIGS. 36-38 and associated descriptions). At least some parts of the mapping tools 100 may be stored as instructions on a given instance of the removable storage medium 138, removable device, or in local data storage 132, to be loaded into memory 130 for execution by the processor 128. Although the illustrated mapping tools 100 are depicted as programs residing in memory 130, they may also be implemented as hardware, such as application specific integrated circuits (ASICs) or as a combination of hardware and software.

In an example implementation of this example system, the computing device 102 may receive field data via the network interface 134, in the form of maps 122, derived from seismic data 140 and well logs 142 from geophones, well measurement devices, and other sensors at a potential petroleum field or other subsurface earth volume 126.

A user interface manager 114 and display controller 144 may extend an associated user interface 146 on a display 150 (and input/output for mouse, pointing devices, keyboard, touch screen, etc.), as well as geologic model images 148, such as a 2D or 3D visual representation of layers or rock properties in a subsurface earth volume 126. The displayed geologic model images 148 may generated by the mapping tools 100. The mapping tools 100 may perform other modeling operations and generate useful user interfaces 146 via the display controller 144, including novel interactive graphics, for user control of processes generating Chance of Success maps 152 or other maps.

In an example implementation, the chance maps 152, representatively called Chance of Success maps 152 herein (also known as and alternatively cast as risk maps or chance of failure maps), can also be utilized to generate control signals to be used via control devices in real world prospecting, modeling, exploration, prediction, and/or control of resources, such as petroleum production, water resource management, carbon services, etc., including direct control via hardware control devices of such resources as drilling, injection and production wells, reservoirs, fields, transport and delivery systems, and so forth.

Example General Operation

In an example implementation, the example system can generate a living play chance map 152 from geological properties 124 or attributes inherent in the input geologic maps 122 (for example, porosity). When there is a change in the geological properties 124, the generated play chance map 152 may adapt in real time to provide updated risk or Chance of Success features, maps 152, and output. Thus, an example system provides a dynamic play chance map 152 that can show, for example, Chance of Success in real time, based on changing geological properties 124 or user-initiated hypotheticals, e.g., as entered via the example user interface 146.

The example user interface 146 can access the matrix builder 112 for creating Chance of Success maps 152 (e.g., prospect assessment) and enables the user to create and specify a custom hierarchical matrix of risk maps, including the dynamically linked input maps and data, and the dynamic links themselves. The user can specify sub-maps and sub-matrices for construction of the main risk matrix, and can select and drop maps and other matrices directly into the main matrix.

When provided with a geologic property map 122, or with selected representative geologic property values 124 from maps 122, the system may apply one or more customizable transforms 110 to programmatically generate the chance map 152, which in turn may then be compiled into or used as a precursor for a larger, overall chance map 152, e.g., for common risk segment mapping (CRSM).

For uncertainty assessment, the uncertainty engine 120 may provide visual and navigation tools via the user interface 146 for enabling the user to harvest a geological property 124 of interest directly from the geologic maps 122. The desired parameter values 124 can also be entered manually, in a direct manner. The user can draw a polygon around an area of interest (AOI) on a geologic map 122 to collect parameter values of the property 124 and then "drag-and-drop" the selected visual region containing the desired property values 124 directly into an uncertainty mapping capability of the uncertainty engine 120 or distribution builder 118, which may apply a Monte Carlo simulation. Specifically, the user interface manager 114 may enable the user to obtain minimum, peak, and maximum petroleum-system parameter values from a map 122 with user-friendly visual selection tools, which then feed the distribution builder 118 to perform uncertainty and prospect assessment. By obtaining geological data directly from the geological map(s) 122, values in the distribution and thus the uncertainty assessment are tied directly to geologic reality without conventional guesswork.

In an example implementation, an example system may build a distribution for each grid node in multiple 2D or 3D models of a resource. In a grid-node-to-grid-node manner, an example technique and merge tool 116 converts multiple petroleum-system parameter coefficients that result from multiple geologic interpretations, into a single Chance of Success value for each grid-node. The merge tool 116 develops an integrated Chance of Success map 152, combining multiple geologic scenarios (multiple maps of the same prospect) into a single summary expression of Chance of Success for a parameter at each grid node of a single resulting map 152.

Example Implementations

When provided with a geologic property map 122, or with selected representative geologic property values 124 from maps 122, an example mapping tool 100 applies one or more transforms 110 to programmatically generate the chance map 152, which in turn may then be compiled into, or used as, a precursor for an overall chance map 152, for example, a common risk segment map 152.

A property-to-chance transform 110 for play chance mapping can be viewed as a function converting a geologic property at each grid-node in a model of a surface or in a model of a subsurface volume 126 into a chance of success value. Thus, a chance of success value at each grid-node may be determined from a geologic property through the property-to-chance transform 110. Chance of success (COS) is used representatively herein, but chance of failure can also be used, where COF=1−COS.

In order to estimate the chance of success for a given play to be feasible, the matrix builder 112 may decompose the change into sub-elements (COS for a reservoir, for a seal, for a trap, etc.). Each of these sub-elements can be split up still further into lower levels. For example, COS for a reservoir may include a combination of COS for reservoir presence and COS for reservoir quality, thereby building a matrix that has a desired degree of complexity.

Figure 2:
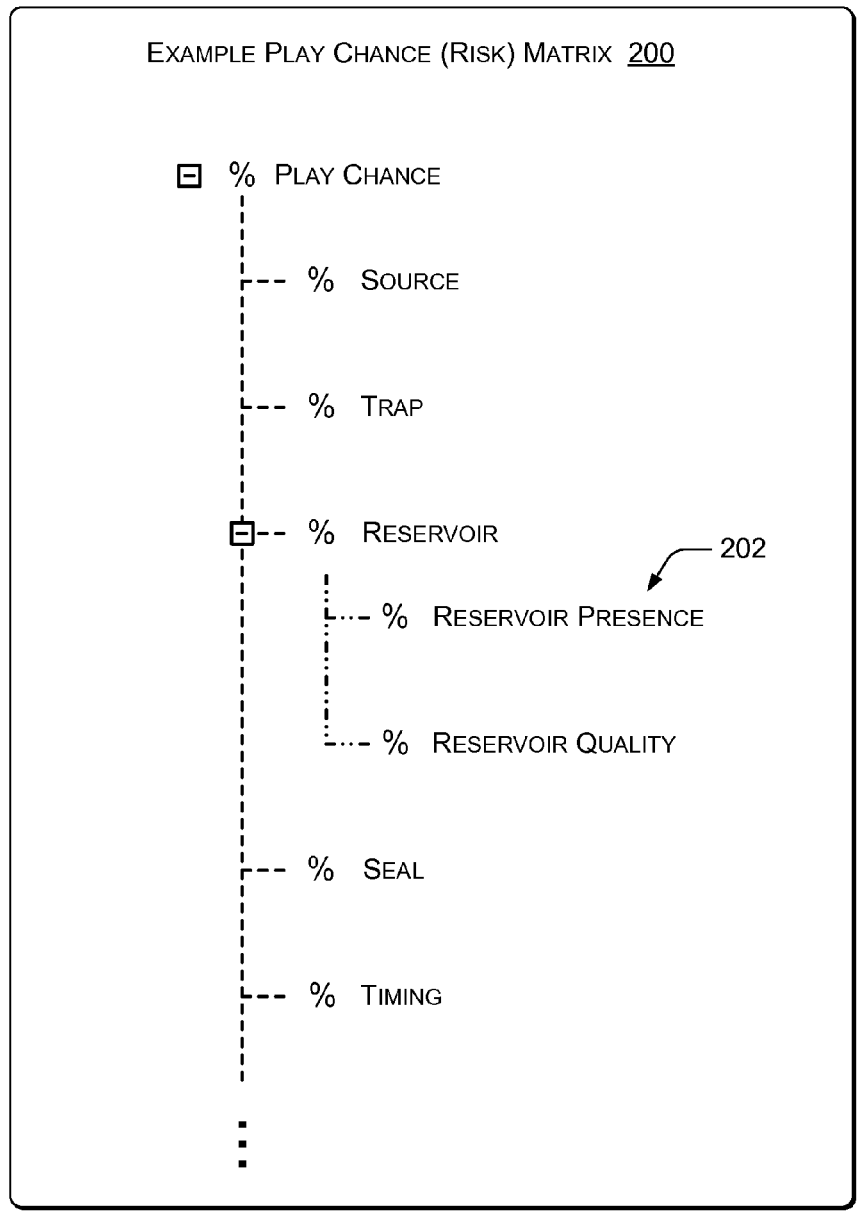
FIG. 2 is a diagram of an example play chance matrix.

FIG. 2 shows an example (e.g., simplified) play chance matrix 200 (i.e., risk matrix 200). The matrix 200 defines the nature and characteristics of the final COS map 152. In order to populate the sub-element chance maps 152 at the lowest level elements that branch (toward the right side 202 of the matrix) the matrix builder 112 may utilize some geological arguments. As an example, porosity can be used as a geologic property 124 in order to define the reservoir quality (another geologic property could just as easily be used as a representative example). A geologist making an evaluation via the example mapping tool 100 can qualify the porosity as "good" and therefore decide for a high COS (or low COF) for reservoir quality and use this value in matrix construction for further calculations of play chance.

In some simulators 104, (e.g., PETREL, which is developed and distributed by Schlumberger, Ltd, Houston Tex. and its affiliates) the geologist can easily quantify porosity with a porosity map 122 for the given reservoir. The porosity map 122 may have a certain range of porosity values, varying with X and Y position, e.g., from approximately 5% to approximately 20%. The geologist may estimate, for example, that below a porosity of approximately 8%, the reservoir quality may considered "bad", and a porosity of more than approximately 15% may be considered "good."

The geologist may also define "good" and "bad" via the matrix builder 112. As an example, with perfect data quantity and quality and a reasonably correct geological interpretation, "good" can mean COS=1 (COF=0) and "bad" can mean COS=0 (COF=1). However, in certain cases, e.g., in frontier exploration, data and interpretation may be highly uncertain, so a geologist's definition of "good" might not exclude failure and "bad" might not exclude success. As an example, this can mean that "good" may have a COS<1 (COF>0) and "bad" a COS>0 (COF<1). In an example, COS<=0.7 (COF>=0.3) may be used for "good" and COS=0.3 (COF=0.7) may be used for "bad" (the foregoing are merely example values, and other ranges are possible). This limitation of the COS (COF) scale may prevent the geologist from terminating prospect exploration of an area with an unduly "bad" result or giving an unduly high recommendation to another area with a "good" result. The resolution of the uncertainty issue may be useful to the interpretation.

In an example implementation, both the geological arguments (e.g., porosity 302) and the chance (COS/COF) 304 may constitute a transform 110 and may be entered into a table 300 by the geologist, such as, for example, the property-to-chance transform table 300 for porosity shown in FIG. 3.

At each cell of an input porosity map 122, the porosity value 124 may be transformed into chance of success (COS value) using the property-to-chance transform 110. As an example, the minimum porosity value of the map 122 (approximately 5%) may be assigned a COS of 0.3, which may be the same as a porosity of approximately 8% ("bad"). A porosity of approximately 10% (between "good" and "bad") may be assigned a COS of 0.5, and porosities>=approximately 12% ("good") may be assigned a COS of 0.7.

Figure 4:
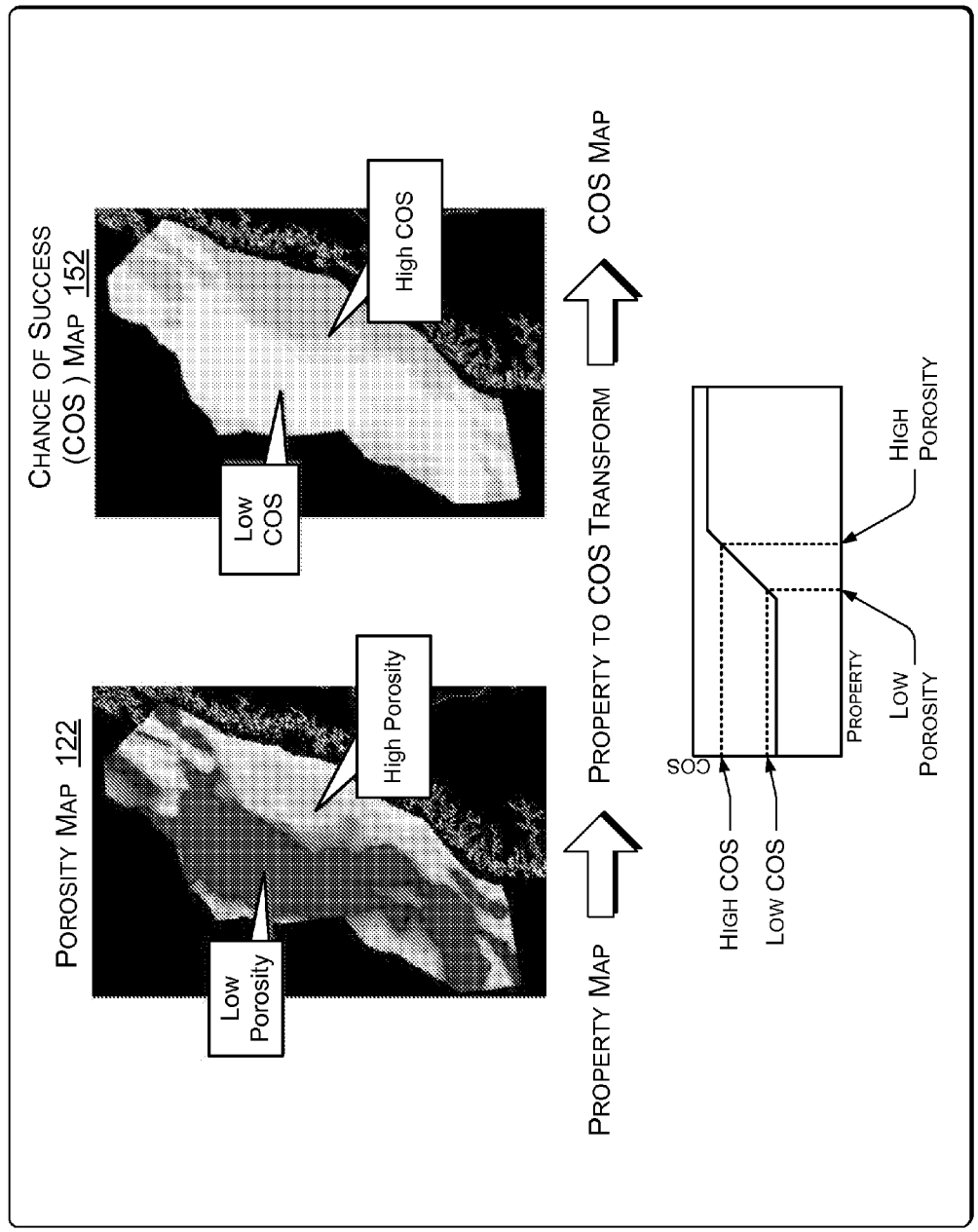
FIG. 4 is a diagram of an example property to chance of success map conversion via transform.

FIG. 4 shows how a continuous porosity map 122 may be transformed into a continuous chance of success (COS) map 152 (limited to values between 0.3 and 0.7) using the example property (e.g., porosity-to-chance (COS) transform 110.

In an example implementation, the mapping engine 108 applies the transform 110 to execute real time updating of the COS map 152.

Example Capture of Matrix and Map Data

An example data capture tool 106 implemented by the user interface manager 114 may be used to gather geological data, such as geologic maps 122 (e.g., play fairway maps) for construction of the risk matrix 200 and geological property data 124 from the geologic maps 122 for uncertainty studies and also for matrix construction. In an example embodiment, the data capture tool 106 gathers real property values from a geologic map 122 and ties an expression of uncertainty in chance of success mapping back to geological reality—i.e., instead of basing the uncertainty on guesswork or reliance on pure intuition as in conventional techniques.

In a prospect assessment (PA) setting, the example data capture tool 106 may target a workflow in exploration—e.g., that of prospect assessment and ranking utilizing the Monte Carlo process. The result may include an estimate of a range of in-place and recoverable hydrocarbon resources (e.g., oil, free gas, solution gas, condensate, etc.).

Early in a prospect assessment process, it may be useful to determine whether or not a particular prospect is a practical investment opportunity. At the early assessment stages, little information may be available and there may exist uncertainty regarding petroleum-system parameters (charge, timing, migration, reservoir, trap, seal, recovery, etc.).

A stochastic process may allow an explorationist to express, without having to provide statistical input (variance, kurtosis, mean, standard deviation, and so forth) the uncertainty regarding primary petroleum-system variables. Stochastic processing may result in a range of possible recoverable resources, an estimate of chance of technical success, an estimate of chance of economic success, and separate lists of parameters that may contribute to potential failure and to uncertainty in the volume of recoverable hydrocarbons.

Figure 5:
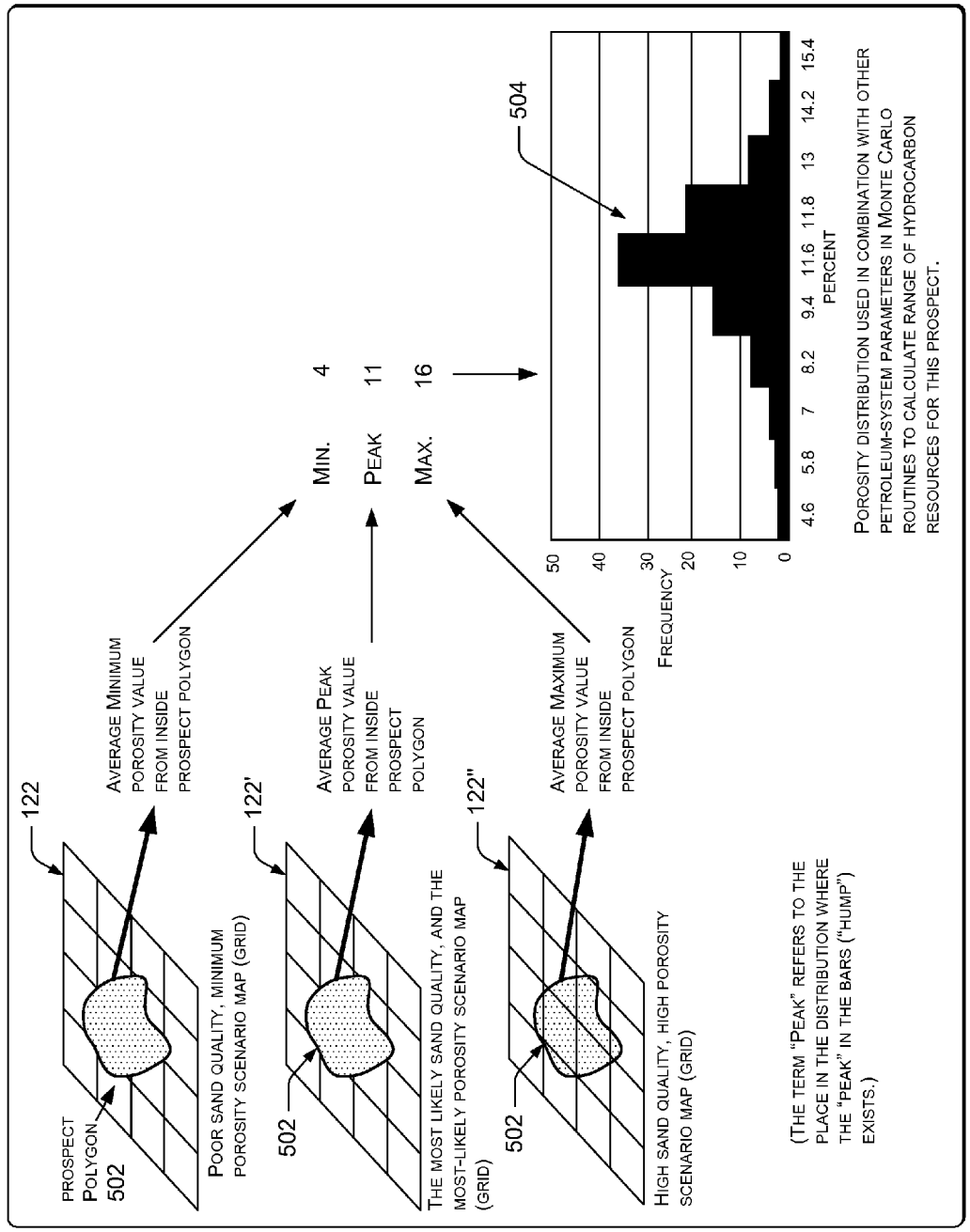
FIG. 5 is a diagram of an example process of selecting an area of a geological map to drag-and-drop property values into a distribution for creating a live chance of success map.

In an example implementation, the uncertainty engine 120 may capture or assess uncertainty using a distribution of values 504 as illustrated, for example, in FIG. 5. In an example distribution-building scheme, such distributions may be built, in part, by the user supplying some combination of minimum, peak, and maximum values.

Human explorationists may supply coefficients for minimum, peak, and maximum values by applying their geologic intuition regarding analogous situations they have experienced or by making estimates of such coefficients by inspection of maps 122. The example data capture tool 106 described herein may facilitate the automatic calculation of minimum, peak, and maximum values for a petroleum-system parameter, and seamless passage of these coefficients to the uncertainty engine 120 and prospect assessment distribution builder 118 so that uncertainty about that parameter can be utilized in Monte Carlo resource volume calculations. In an example implementation, the uncertainty engine 120 and distribution builder 118 may automatically derive minimum, peak, and maximum values representing three geologic scenarios that describe the range of possibilities for a property parameter value 124 in a particular play.

A feature of prospect assessment is its ability to utilize diverse input: data derived from various maps 122 and map polygons generated in play chance mapping, common risk segment mapping (CRSM), and other functions of simulators 104, such as PETREL.

The subsurface petroleum-system parameter "porosity" will again be used to illustrate aspects of the example data capture tool 106. The process described below, however, can apply to any petroleum-system parameter 124 about which the explorationist is uncertain (for which a data distribution would be uncertain) and which contributes to the calculation of hydrocarbon resources.

In an example implementation, an example workflow mediated and facilitated by the mapping tools 100 proceeds with the explorationist creating, for example, three maps 122 representing three different geologic scenarios. These scenarios, for example, may include one or more of the following:

Scenario #1—a situation in which poor quality and poorly-sorted sand constitutes the prospect reservoir rock. These rocks would, therefore, have relatively low porosities.

Scenario #2—a situation in which sands of "average" quality constitute the reservoir rocks. This may be the "most likely" scenario because the explorationist has previously experienced this type of reservoir rock in other similar prospects. Porosity values for this scenario are "middle of the road" in magnitude.

Scenario #3—a situation in which very high-quality sands with corresponding high porosity values characterize the reservoir.

FIG. 5 shows an example data capture process for assessing uncertainty. In an example implementation of the example data capture tool 106, a prospect polygon 502 is drawn on each of these three maps (grids) 122, 122', and 122":

1. The corresponding mean porosity value is calculated from a plurality of the grid-node values that fall within the prospect polygon 502 (e.g., all grid-node values).
2. The mean minimum, mean peak, and mean maximum values may be "blue arrowed" (e.g., dragged-and-dropped) into the minimum, peak, and maximum data-input slots of the distribution builder 118.
3. The distribution builder 118 may use these three values (or some combination of these values) to create a distribution 504 that will be utilized in the Monte Carlo hydrocarbon-resource calculations.

If minimum, peak, or maximum values are not placed (e.g., blue arrowed, or dragged-and-dropped) into the data-input slots in the example distribution builder 118, then the user can simply type in values that were not selected and dragged in from maps 122.

Figure 6:
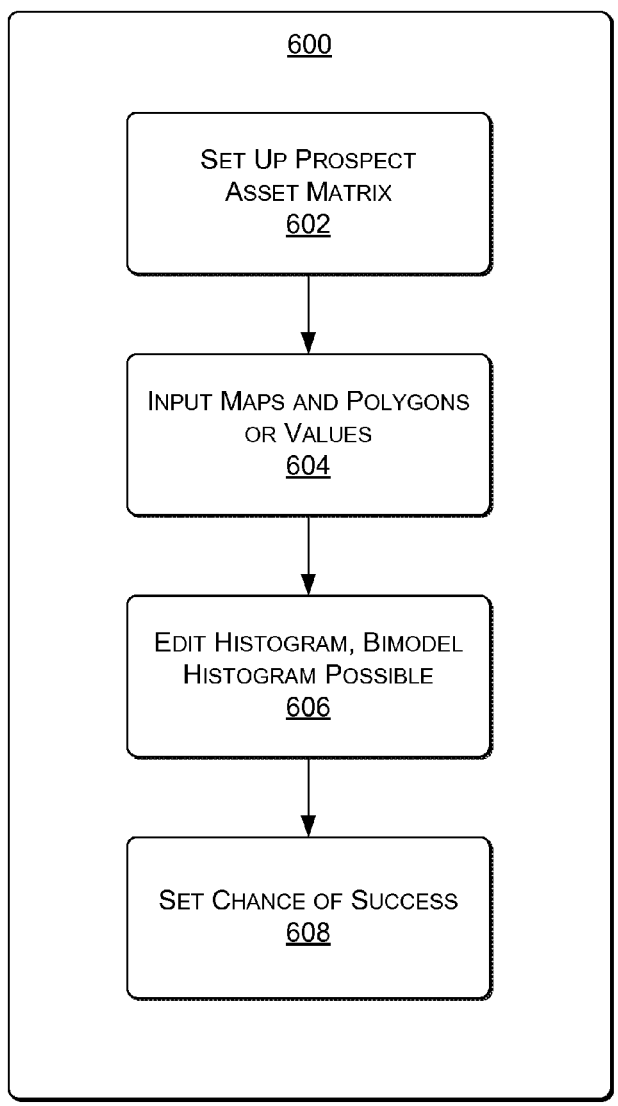
FIG. 6 is a flow diagram of an example process setting up a chance of failure map.

FIG. 6 shows a workflow 600 for interacting with the example user interface 146 associated with the example data capture tool 106.

At block 602, a prospect asset matrix is first set up.

At block 604, maps, polygons, and/or values are input using the data capture tool.

At block 606, a histogram resulting from a distribution of the input data and values can be edited.

At block 608, a chance of success (or chance of failure) is set.

Figure 7:
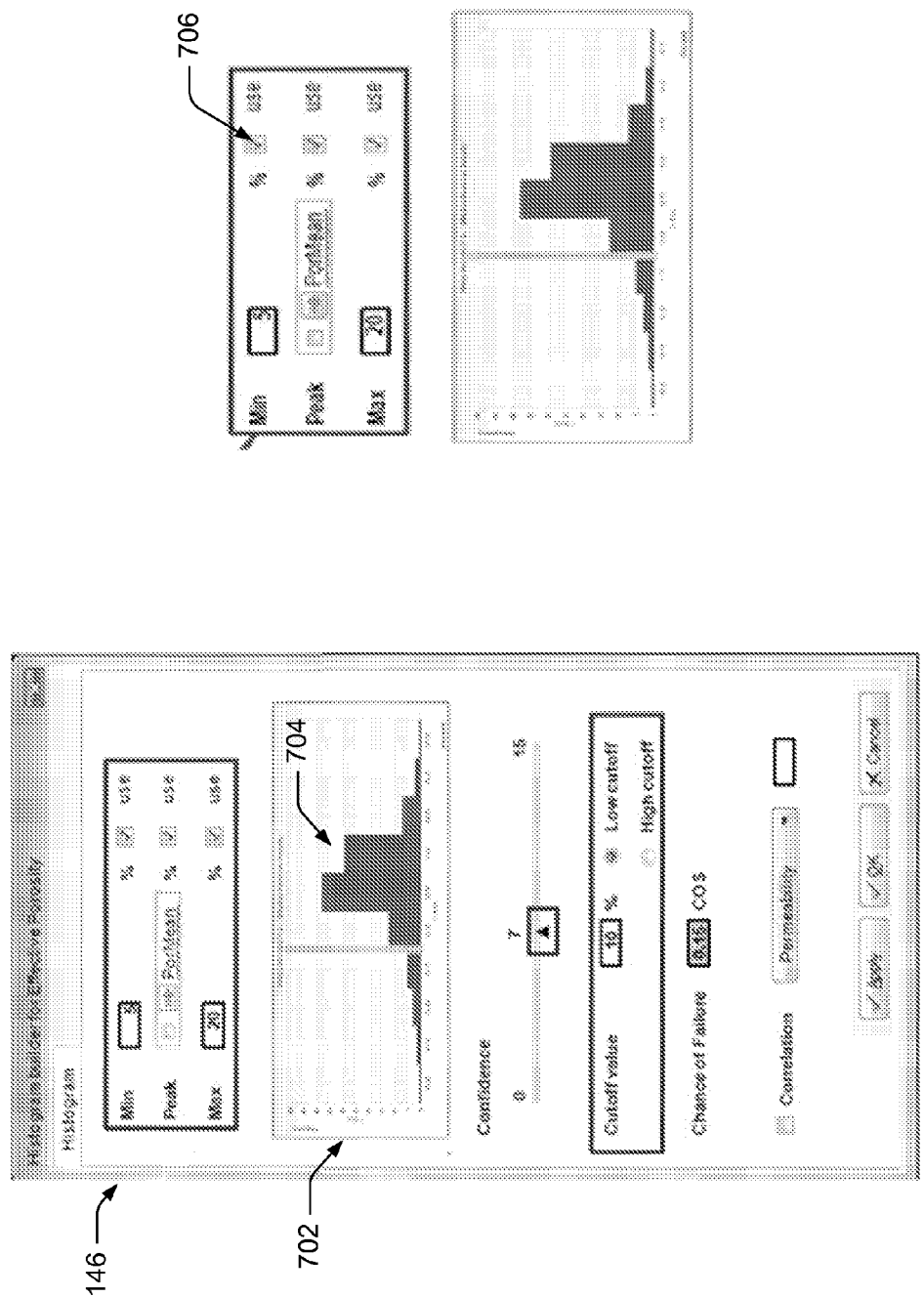
FIG. 7 is a diagram of an example histogram or distribution builder for creating a chance of failure map.

FIG. 7 shows a screenshot of an example user interface 146 for histogram building associated with uncertainty assessment. Data gathered by the data capture tool 106 for the distribution builder 118 may be cast as a histogram 702. Chance, in this example, may be cast as chance of failure (COF). The histogram 702 allows a number of inputs and combinations of parameters to create a desired histogram shape 704 for assessing uncertainty. For example, input from a map 122 can be used for all three of minimum, peak and maximum values, or for just one or two of these. Numeric input can be used as an alternative to maps 122 or in combination with maps 122. The minimum, peak and maximum values can be toggled on and off, for example, "off" so that the histogram 702 does not use these numbers. Thereby, numerous possible histogram types can be created. The example histogram 702 may update automatically when an input item is changed by the user.

Input from a map 122 may be averaged within the user-selected polygon areas 502 of the prospect. Each polygon area 502 may be selected by the user. In an example implementation, the example data capture tool 106 may take only values from within the selected polygon area 502 for minimum, peak and maximum values.

Example Grid-to-Grid Merge Tool

Prospects may be investment opportunities for any energy company or agency. Certain energy-business entities, at any given moment, may have more opportunities in their portfolio than they can reasonably pursue due to budget and other constraints. Therefore, it may be useful that opportunities be ranked so that the most profitable prospects are initially pursued. Evaluation of any prospect may include, at least, the culmination of the combination of estimated recoverable hydrocarbon volume and the prospect's chance of geologic success (GCOS). The GCOS is the combination of the chance values for each of the pertinent petroleum system parameters for a prospect. For each of those parameters, again using porosity as a current example, multiple geologic scenarios can exist. At any given location (position of the prospect), multiple coefficients (percent porosity in this example) for a parameter might exist.

The example prospect merge tool 116 can perform a grid-to-grid merge of multiple geological scenarios. A given exploration prospect or play (e.g., a subsurface volume 126) may have associated with it several different geologic interpretations. The given subsurface volume 126 may be viewed in terms of different geologic properties, each property resulting in a different set of petroleum-system parameter coefficients within a 3D grid that models the subsurface volume 126. Or, the subsurface volume 126 may be viewed in terms of one property 124, but the explorationist may assign several different hypothetical values to the property 124 in order to develop a chance map 152 that is based on minimum, peak, and maximum values, for instance. The different values assigned to each grid-node (or cell) may give rise to different theoretical grids.

In an example implementation, the example prospect merge tool 116 may apply an equation to facilitate, at each map grid node, the conversion of multiple petroleum-system parameter coefficients, e.g., resulting from multiple geologic interpretations, into a single Chance of Success value at that grid node. The example grid-to-grid merge tool 116 can feed information to exploration applications, for example those that perform Prospect Assessment and Play Chance Mapping.

The example grid-to-grid merge tool 116 may support a commonly-practiced workflow in exploration: that of Prospect Evaluation and Ranking utilizing Monte Carlo simulations to determine recoverable volumes and to estimate a Geologic Chance of Success (GCOS) for a given investment opportunity. As introduced above, the GCOS represents the probability that elements of the petroleum system (migration, trap timing, reservoir, charge, seal, and so forth) will successfully combine to yield a viable prospect.

In the beginning of the prospect-assessment process it may be useful to estimate the volume of hydrocarbons (e.g., oil, free gas, solution gas, condensate, etc.) that can be taken to market. It may be also useful to calculate the prospect's GCOS. The GCOS may result from the combination of the chance of failure associated with each pertinent petroleum system input parameter (porosity, net-to-gross, and the like).

For investment purposes, a prospect's GCOS may need to be reasonably determined. For example, if two prospects are both estimated to potentially produce one-hundred MMBOE (100 Millions of Barrels of Oil Equivalent) but one prospect has an approximately 5% chance of being geologically successful while the other has an approximately 30% chance of geologic success, an investor may decide that capital should be spent on the opportunity with the higher GCOS. Therefore, in certain situations, ranking of prospects by hydrocarbon-volume potential alone may not be good business practice.

For play chance mapping, porosity is again selected as an example parameter 124 for the sake of description. But any pertinent petroleum-system parameter 124 can serve as the example property. The example prospect merge tool 116 may facilitate utilization of maps 122, such as PETREL-created maps 122, for hydrocarbon-related parameters and for the transformation of the coefficients of those parameters 124 (percent porosity in this example) into Chance of Success (COS) or chance of failure (COF) coefficients. The example prospect merge tool 116 addresses instances in which multiple possible geologic scenarios exist for a location and correspondingly, multiple corresponding values of a property 124 at that location.

For example, the explorationist might believe that a physical structure such as an anticline (as a prospect) exists in an offshore buried river delta. The deltaic sedimentary rocks in which the prospect is believed to exist may have been deposited millions of years ago. The anticline may have formed long after the sedimentary rocks were deposited in the delta. Initial investigations, mainly through seismic interpretation, might not make clear the extent to which satisfactory-quality sands were deposited in the area of the anticline. Thus, referring to FIG. 8 and using porosity as an example geologic property 124, the following scenario describes an example use of the example merge tool 116. From experience with similar reservoirs and geologic settings, an explorationist may know that if the porosity in a current prospect is below approximately 5%, for example, then flow rates may be too low for the prospect to be economically successful. So this approximately 5% value may be adopted as the cutoff value (shown in FIG. 8).

The explorationist may create a porosity grid (map) 122 for the geologic scenario in which sand that did reach the prospective area might not be of a certain quality to create a viable prospect. This situation may be represented by the minimum (top) porosity map 122 shown in FIG. 8. How to create such porosity maps 122 is already common knowledge among explorationists.

First Geologic Scenario 802: Sand that did reach the prospective area might not be of a certain quality to create a viable prospect. This situation is represented by the top grid 122 in FIG. 8.

The explorationist may create a porosity grid (map) 122 for the geologic scenario in which sufficient desirable sand did reach the area of the anticline (prospect). This situation may be represented by the maximum (middle grid)) porosity map 122' shown in FIG. 8.

Second Geologic Scenario 804: Sufficient desirable sand did reach the area of the anticline (prospect). This situation is represented by the middle grid 122' in FIG. 8.

Figure 8:
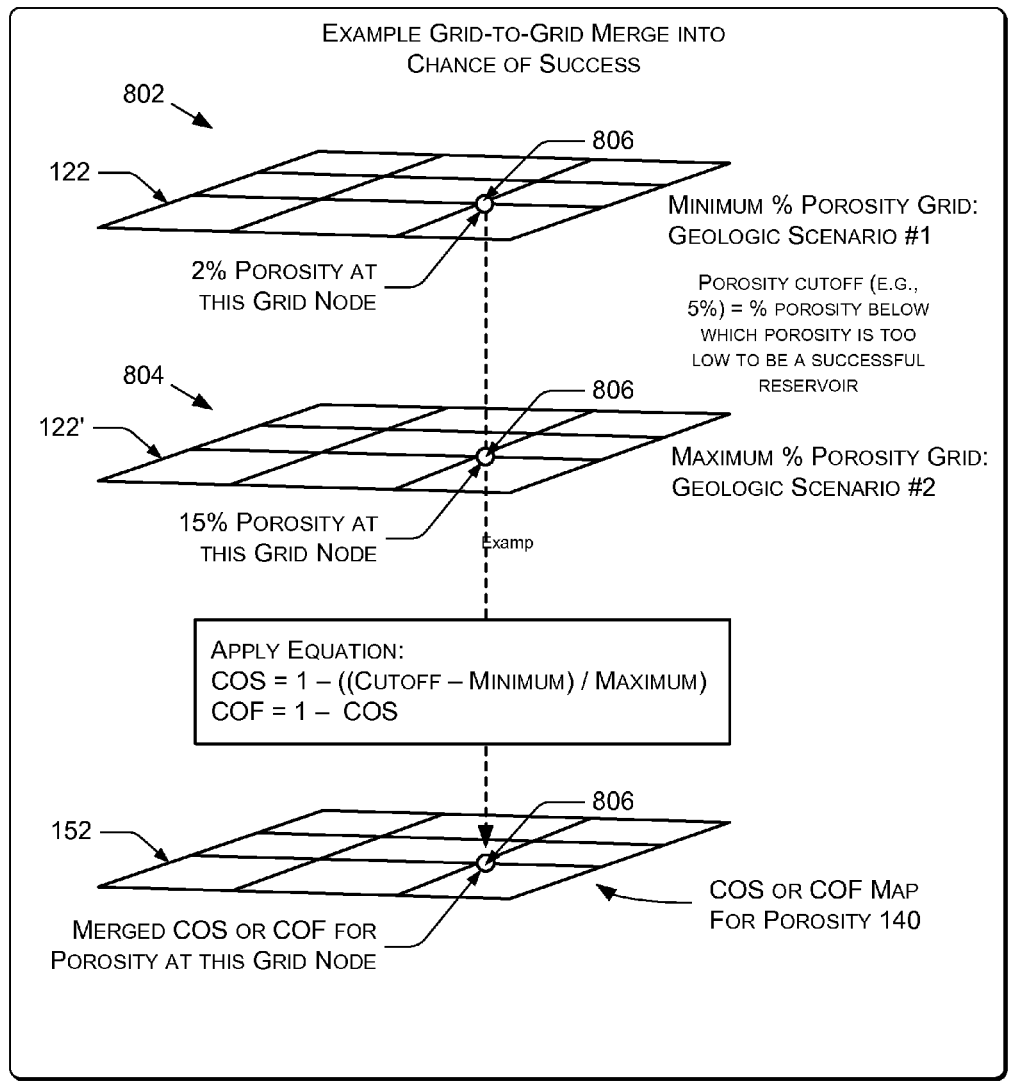
FIG. 8 is a diagram of an example merge process for generating a single chance of success value for a distribution of geologic values at each grid node of a grid that is modeling a play or prospect.

Referring to FIG. 8, the geologist might thus produce two maps 122 and 122' of percent porosity for the same area to reflect the two aforementioned scenarios 802 & 804. The percent porosity at any given location 806 (grid-node location on a map 122) might be markedly different reflecting the reality of the disparate scenarios 802 & 804. The example merge tool 116 converts these two maps 122 & 122' into a single Chance of Success map 152 for porosity. A description of Equation (1) below delineates an example merge process executed by the merge tool 116.

On computer-generated maps 122, the example merge tool 116 combines multiple property values at each grid node 806 on the input map(s) 122. The mean of the Chance of Success values from within a prospect-outline polygon on a resulting COS map 152 generated by the process can then be passed to an application, such as a Prospect Assessment (PA) application.

In an example prospect assessment, corresponding hydrocarbon volumes and chance of success values for a prospect can be combined for the purpose of ranking the prospect against similarly-evaluated prospects. This process may be used for determining how capital may be distributed over a portfolio of potential investment opportunities (i.e., the prospects).

The example merge tool 116 can enhance conventional techniques by facilitating the combination of ever-present multiple-geologic scenarios 802 & 804 into a single expression of COS (or COF) for a parameter.

In the context of play chance mapping, the example merge tool 116 facilitates the combination of multiple (e.g., two as in FIG. 8) estimates of a parameter coefficient, two values for percent porosity for a given geologic location, for example, to create a single estimate of Chance of Success (or COF) for that parameter at that location 806. This process may be applied to each location or grid node on a computer-generated map 122. The example merge tool 116 thus combines two grids of parameter values, each grid representing a unique geologic scenario, to generate a single chance map 152 of the same grid nodes.

An equation (algorithm, transform) such as Equation (1) (Koller's Formula) may then be applied to the coincident grid node values in the example top and middle grids, e.g., in FIG. 8, to create a Chance of Success value for the porosity property at that grid node 806.

$$COS = 1 - ((Cutoff - Minimum)/Maximum) \quad (1)$$

where "COS" represents the Chance of Success; "Cutoff" may represent a property value below which an explorationist may determine that the prospect might not be successful, "Minimum" may represent the property value delineating a range of property values in which the prospect, e.g., might not be successful, and "Maximum" may represent a property value delineating a range of property values in which the prospect will likely be successful. In an example embodiment, if a COF (chance of failure) value is required by the application to which success values are fed, then COS is subtracted from 1.

For grid nodes 806 that fall within a prospect polygon 502 imposed on the maps 122, the mean Chance of Success values (or mean COF values) can be calculated and used as the values input to applications, e.g., for prospect assessment. Thus, in FIG. 8, the cutoff value may be approximately 5%, the minimum porosity may be approximately 2%, the maximum porosity may be approximately 15%, and therefore the COS=1-((5-2)/15)=1-3/15=1-0.2=0.8, or approximately 80% Chance of Success (COF=1-0.8 or 0.2 or approximately 20%).

Likewise, a Chance of Success value may be generated at each grid node 806, yielding a map 152 of success (or failure) values. A polygon of the geographic extent of the prospect can be imposed on the map 152 (grid) of Chance of Success (or COF) and the mean of the grid-node values within the prospect polygon can be calculated to be fed to applications such as Prospect Assessment.

Example Real Time Risk Mapping and User Interfaces

A dynamic connection to other types of mapping, e.g., CRSM (Common Risk Segment Mapping), in simulators 104 such as PETREL is an option for the calculation of Chance of Success in Prospect Assessment and Play Chance Mapping using the example mapping tools 100.

In an example implementation, an example system facilitates creation of risk maps 152 (e.g., common risk segment maps 152) and Chance of Success maps 152 by employing various hierarchies and schemes. As introduced above, a resulting map 152 may be provided live in real time, and may be updated automatically when input data changes. The map 152 creation may use a user interface 146 administered by a user interface manager 114, to assist the user to sort through project clutter to create final data inputs, in an integrated user-interface 146. The example system makes it easy to link input maps 122 to risk maps 152, and to create a matrix 200 of risk maps 152. The uncertainty engine 120 also makes it easy to incorporate uncertainty assessment.

In an example implementation, the system has a user interface 146 with tools to create the desired input matrix 200 and hierarchies, via use of various selection/function icons or buttons. Input may be entered using a "blue arrow" drop tool to drag-and-drop the maps 122 or map values into the matrix 200. The link between these maps 122 and the risk maps 152 can be made by the user through a pop-up window or menu where the user enters the relevant information to complete the link.

Additional uncertainty analysis can be performed by the uncertainty engine 120 on each user input. The user may enter a number of inputs, and example equations may produce the risk map 152 between these, or else a distribution and Monte Carlo simulation may be performed.

Once saved, the mapping and linking process can be opened and re-run at any time. Thereafter, the final map 152 may update should the input map 122 be changed. In an example implementation, there is an additional update facility selectable by the user, which scans for updates in the user interface 146 and immediately updates the final map 152 without the user actuating a specific control. This may be applied on changes entered in the user interface 146 during the process, not when there are changes in the input maps 122.

Figure 9:
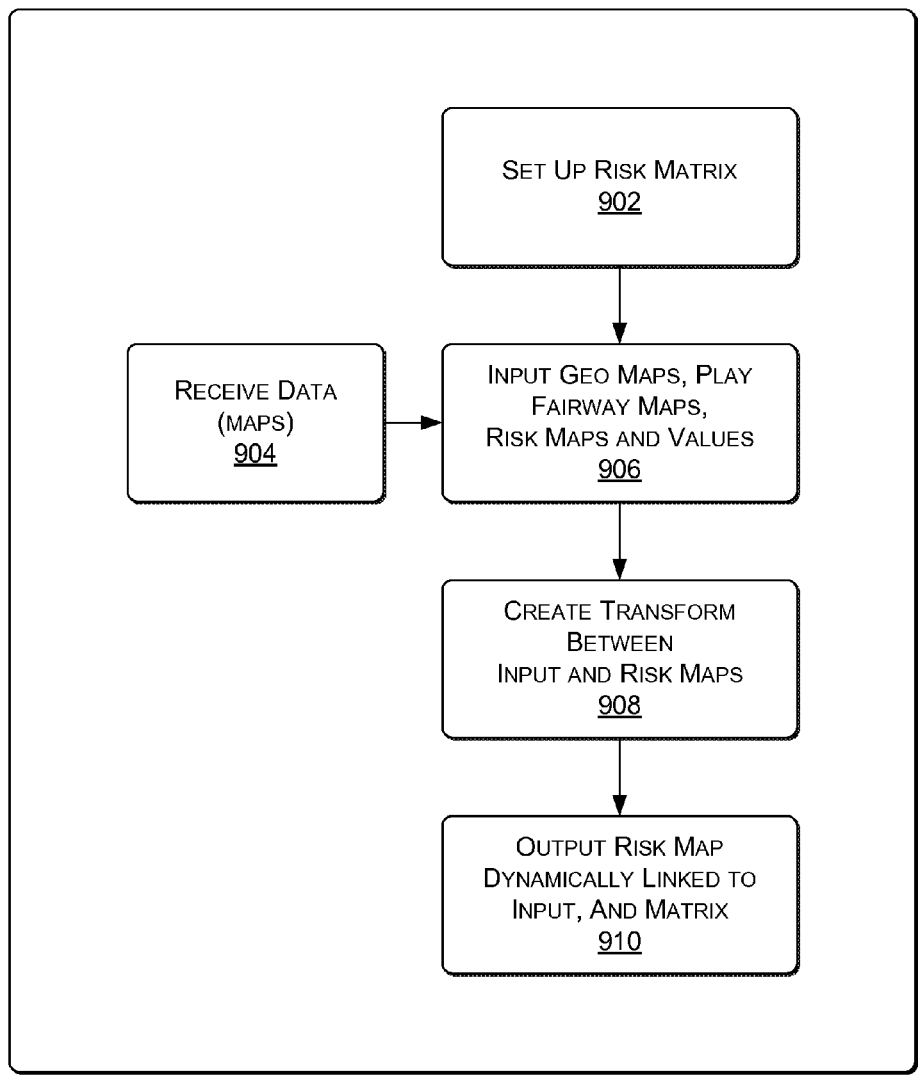
FIG. 9 is a flow diagram of an example process for inputting maps to generate a risk map.

FIG. 9 shows an example workflow, which can be run multiple times using different inputs 122, different transforms 110, or with different risk matrices 200.

At block 902, a risk matrix 200 is set up. At block 904, data is received. The data may include geologic maps 122 and other maps.

At block 906, the received data is input, including received geologic maps 122, play fairway maps, risk maps 152, and values for various parameters on the maps 122 & 152 and parameters related to the prospect being assessed.

At block 908, a transform 110 is created to link the input data and a resulting risk map 152.

At block 910, a live chance or risk map 152 is created that is dynamically linked to (changes in) the data that was input. The matrix set up at block 902 can also be output.

Figure 10:
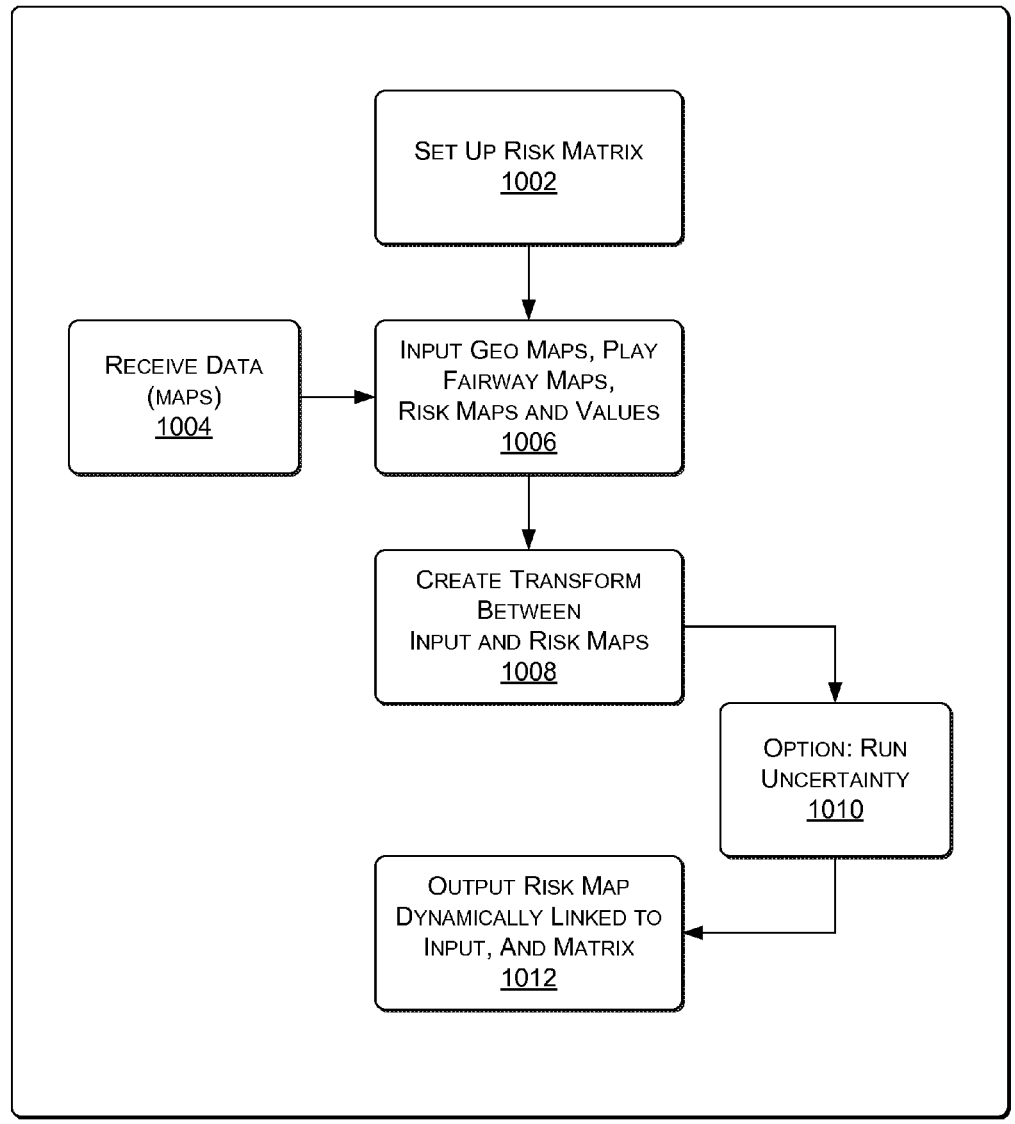
FIG. 10 is a flow diagram of the example process in FIG. 9 with an uncertainty option.

FIG. 10 shows another example workflow that includes introduction of an uncertainty option. Once transforms 110 are complete, the user can choose to run uncertainty assessments using, for example, a Monte Carlo process on one map 122 or by inputting a number of maps 122.

At block 1002, a risk matrix 200 is set up.

At block 1004, data is received. The data may include geologic maps 122 and other maps.

At block 1006, the received data is input, including received geologic maps 122, play fairway maps, risk maps 152, and values for various parameters on the maps 122 & 152 and parameters related to the prospect being assessed.

At block 1008, a transform 110 is created to link the input data and a resulting risk map 152.

At block 1010, one or more uncertainty options are run. An uncertainty map may be created.

At block 1012, a live chance or risk map 152 and/or uncertainty map is created that is dynamically linked to (changes in) the data that was input. The matrix set up at block 902 can also be output.

Figure 11:
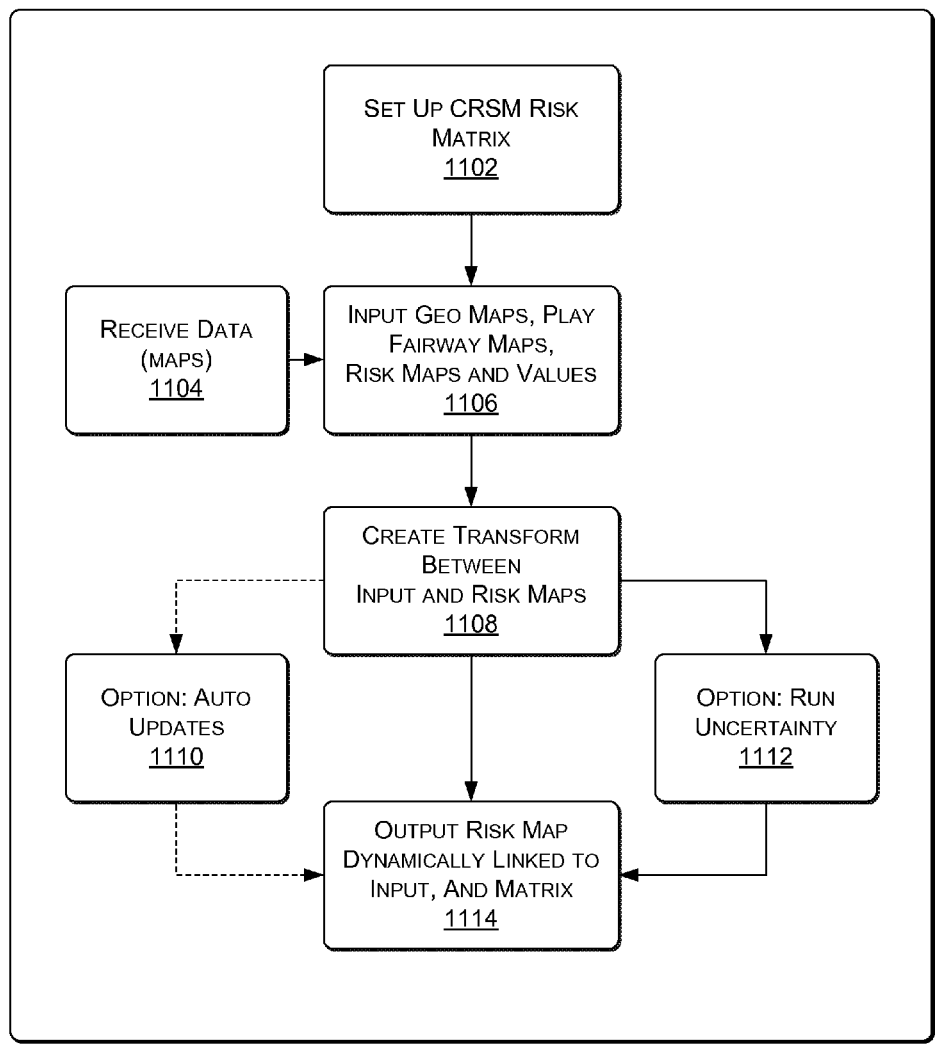
FIG. 11 is a flow diagram of the example process in FIG. 10, with an auto update option.

FIG. 11 shows an example workflow that includes introduction of an auto-update option for transforms 110. In an example implementation, once the user has set up the process, there may be an additional option to apply automatic updates on the transforms 110 so that any changes to the transform 110 will update the final risk map 152 immediately. In an example implementation, the process is run once for this to work. The automatic updating provides an advantage over conventional programs that cannot perform such instant updates. The user may save or store the links that are established between input maps 122 and the resulting output risks.

At block 1102, a risk matrix 200 is set up.

At block 1104, data is received. The data may include geologic maps 122 and other maps.

At block 1106, the received data is input, including received geologic maps 122, play fairway maps, risk maps 152, and values for various parameters on the maps 122 & 152 and parameters related to the prospect being assessed.

At block 1108, a transform 110 is created to link the input data and a resulting risk map 152.

At block 1110, an automatic update option is provided. Although changes in parameters of the input data are already dynamically linked to the resulting risk map 152 via the transform 110 for real time updating, a selection of the automatic update option enables changes to the transform itself 110 to update the final risk map 152 immediately.

At block 1118, one or more uncertainty options are run. An uncertainty map may be created.

At block 1116, a live chance or risk map 152 and/or uncertainty map is created that is dynamically linked to (changes in) the data that was input and to changes in the transform 110 when the auto-update option at block 1110 is selected. The matrix set up at block 902 can also be output.

Example User Interface for Matrix Construction

Figure 12:
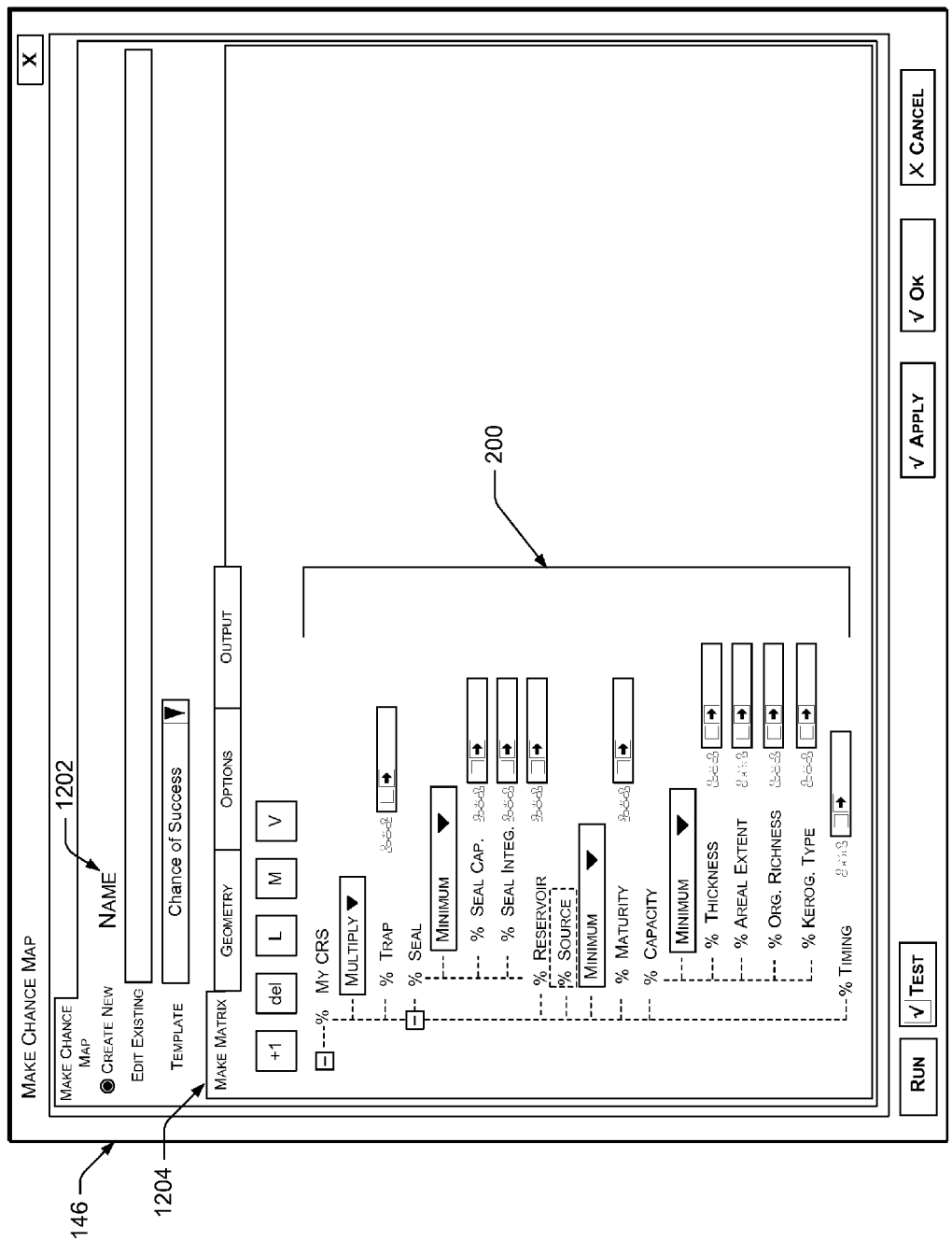
FIG. 12 is a diagram of an example user interface for creating a chance map.

FIG. 12 shows an example user interface 146 for constructing a matrix 200. The shown layout may be displayed by the user interface manager 114 when the user first begins a chance mapping process. The user may first select a name 1202 for the CRSM matrix, risk matrix, or may choose to load and edit a pre-made matrix 200. The system provides flexibility to build many types of play-fairway, risk, or common risk matrices 200 without certain restrictions.

The user may leverage the matrix builder 112 to construct a matrix 200 that contains numerous risk maps 152. There can be numerous inputs of various data maps 122, and there can be numerous risk maps 152 under or within one top-level risk map 152. The hierarchical structure may continue with many levels and many inputs. The matrix 200 can be filled with numbers or maps 122.

The user interface 146 provides several functionalities, including flexible ability to create levels of input, ability to add into the matrix 200 using drag-and-drop or other selection input, ability to select how data will be used to calculate the final chance or CRSM risk map 152, ability to set up how the play-fairway maps 122 are linked to the individual risk maps 152, etc.

The user can set up most types of matrix 200. A user, or company entity, may have unique chance, risk, or CRSM matrix requirements, compared with other users or company entities. Matrix use may also differ between projects. Thus, the structure of the matrix 200 can be flexible.

Figure 13:
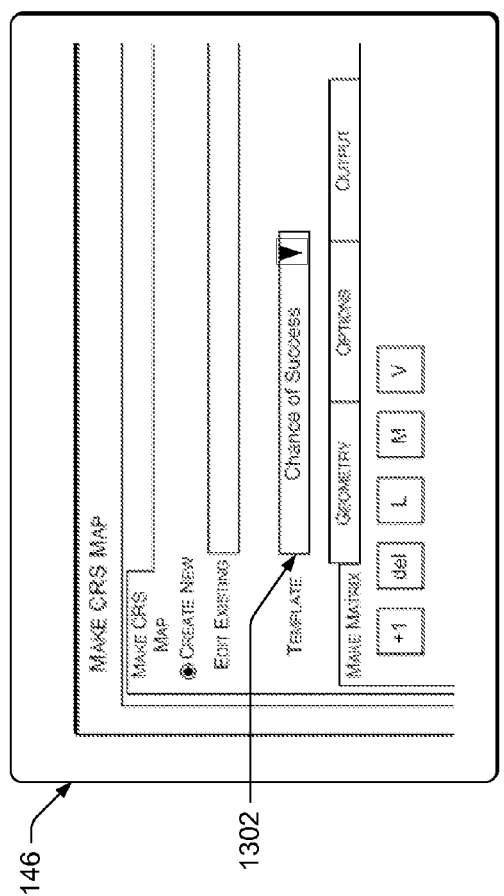
FIG. 13 is a diagram of an example user interface showing default templates.

As shown in FIG. 13, the example user interface 146 may offer options 1362 to choose to build either chance of success (COS) maps or chance of failure (COF) maps using corresponding templates. This option 1362 may include a warning message that appears if the user tries to change from one to the other on an existing template. In an example implementation, the user may select one or the other, COS or COF, and the system may also have a default template. For example, the user may load an existing CRSM template and desire to change it from a COS to a COF. This may be allowed, but a warning message may appear that may cause a problem if the input parameters are not also changed.

In another or the same implementation, an example user interface 146 offers options to set up a CRSM matrix. For example, a first row created in the CRSM matrix may be a pointer to a chance map 152 and may be added by default when a new CRSM matrix is created. This map name may adopt a default under a "create new" option. In an example implementation, by default the first row cannot be just one number, but should be a map input.

Figure 14:
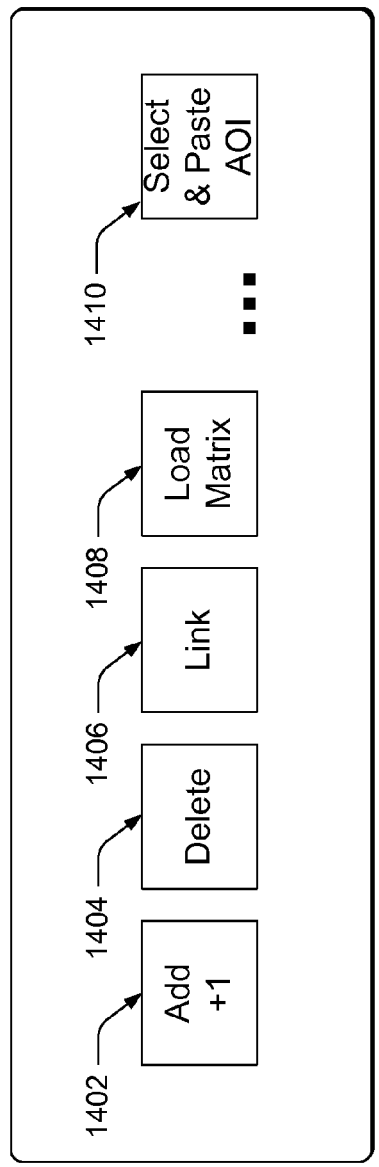
FIG. 14 is a diagram of an example user interface showing icons or buttons for creating and linking input maps and risk maps.

In an example embodiment, the user interface manager 114 may extend to the user capabilities to add other levels of a matrix 200. For example, as shown by the example control icons in FIG. 14, there may be option icons or buttons to add a row 1462, each row representing a new risk map 152; an option to delete a row 1464 (delete a risk map 152); an option to link 1466 a play-fairway input map 122 to a risk map 152; an option to load 1468 an existing (e.g., CRSM) matrix (may not be required if a drag-and-drop or other selection operation 1410 to choose an area of interest (AOI) is used to drop in a domain-specific data).

To add a risk map 152 to a matrix 200, e.g., using add control icon 1462, the place in the matrix 200 where it is to be added (e.g., see FIG. 2 or FIG. 12) can be selected when that place is active. To delete a risk map 152, the risk map 152 may be selected to make it active and then a delete icon 1464 may be actuated. To link 1466 a play-fairway map 122 to an output risk map 152, the risk map 152 may be active and then the relevant option selected. To load 1468 a CRSM matrix, the risk map 152 may be selected and active for the place in the matrix 200 to which the user wishes to load the matrix 200 (or the selection process 1410 or other navigation control accepts a domain-specific matrix icon).

Figure 15:
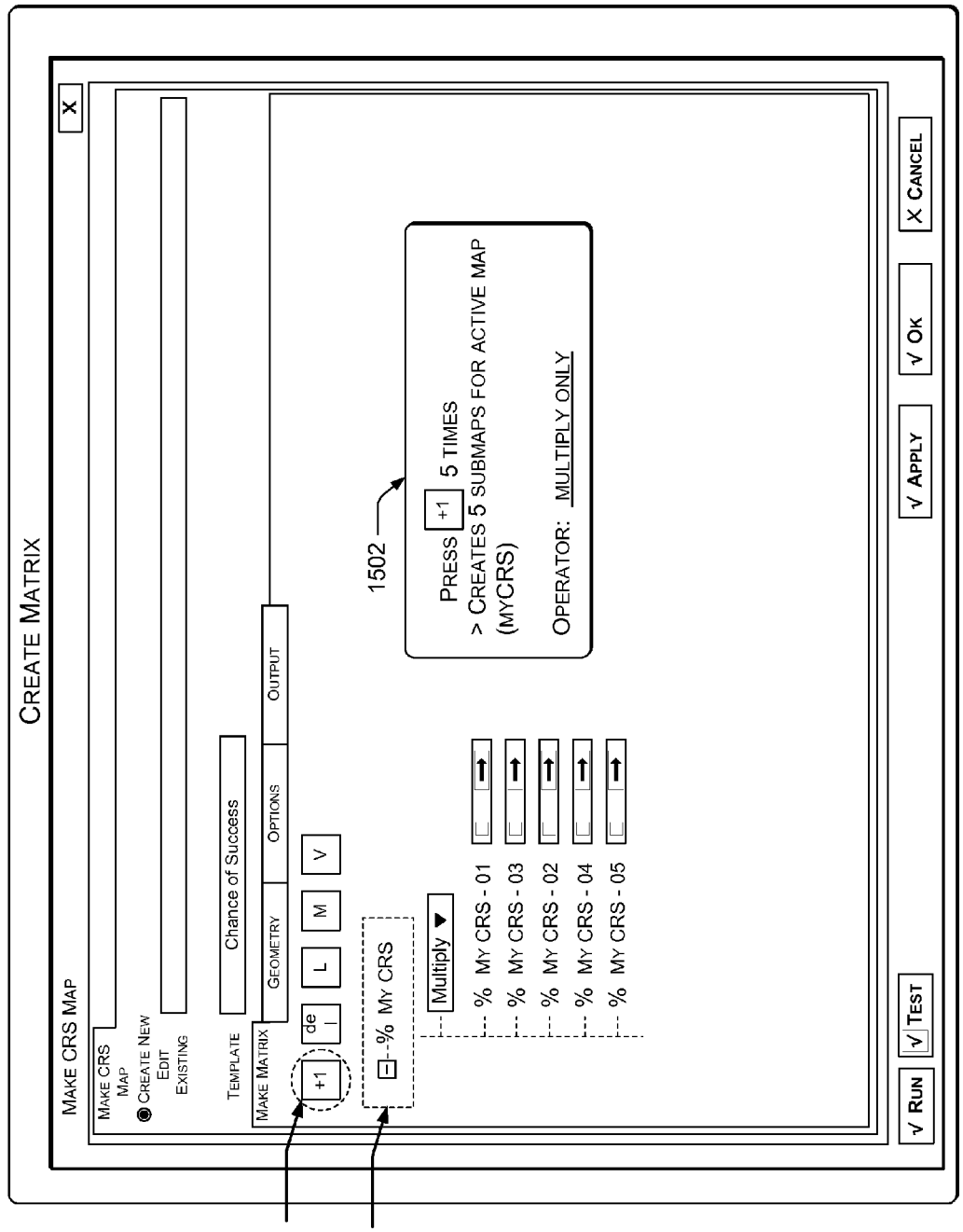
FIG. 15 is a diagram of an example user interface showing creation of submaps during matrix and map creation.
Figure 16:
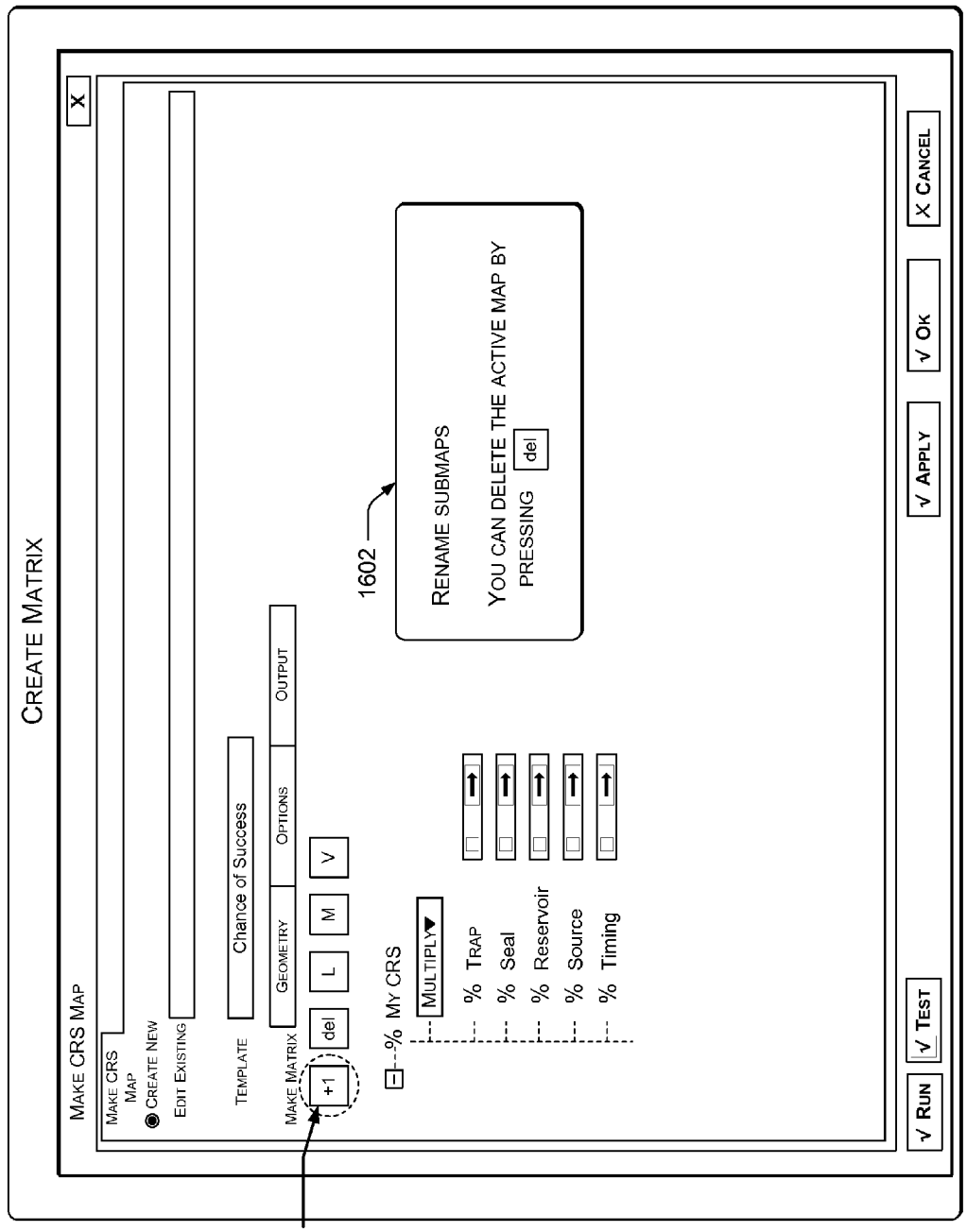
FIG. 16 is a diagram of an example user interface showing matrix handling.
Figure 17:
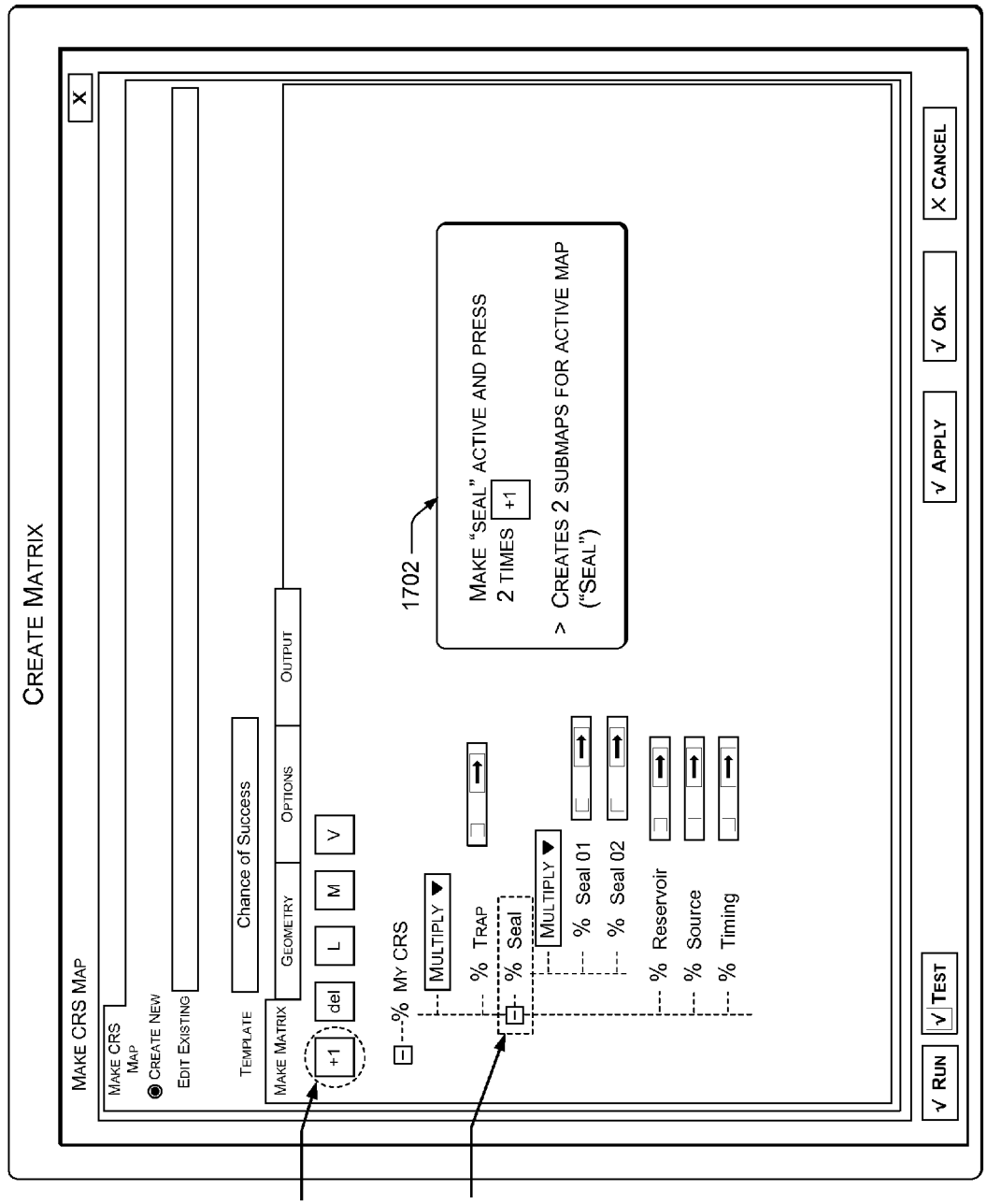
FIG. 17 is a diagram of an example user interface showing matrix creation.
Figure 18:
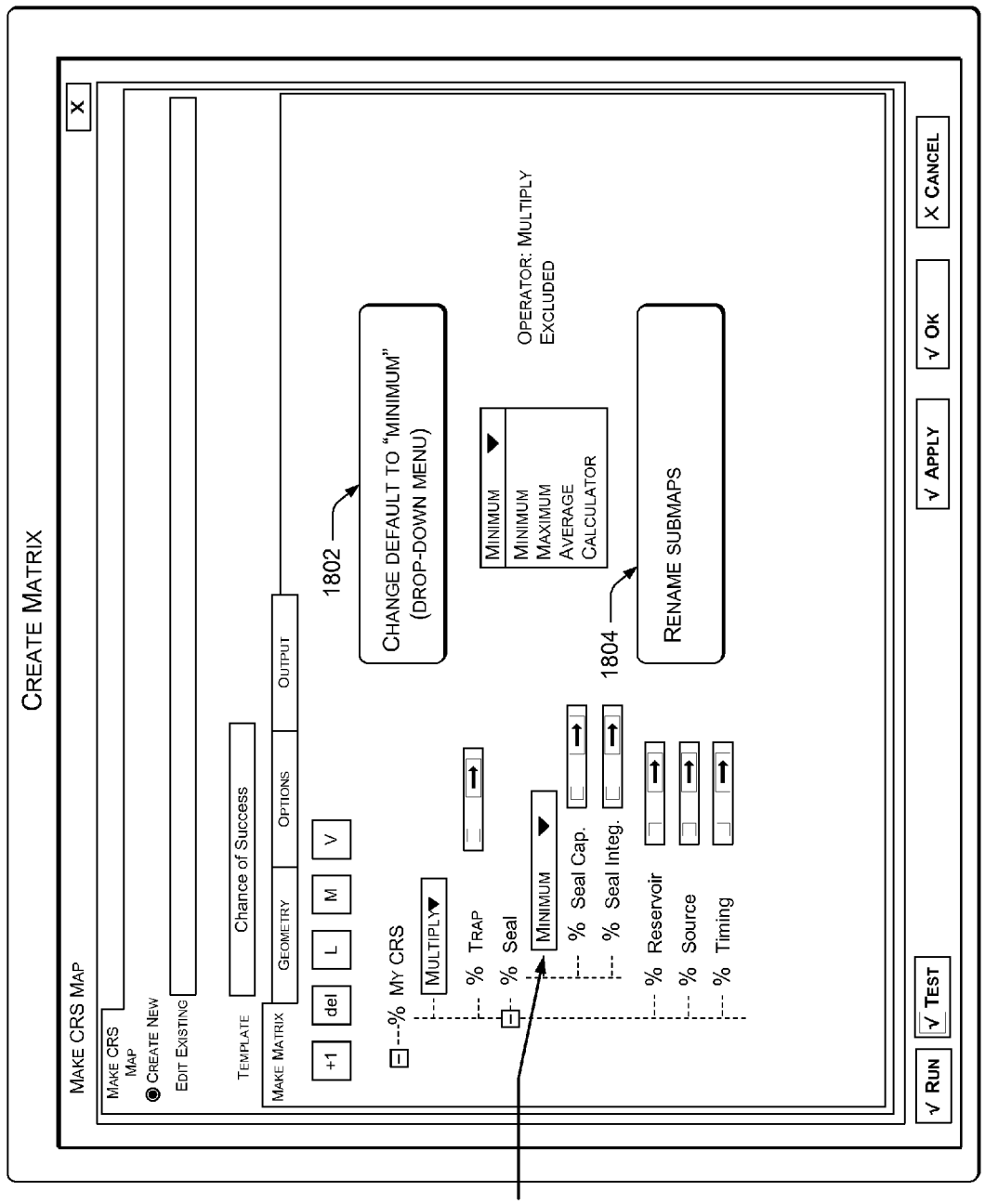
FIG. 18 is a diagram of an example user interface showing value entering during matrix creation.
Figure 19:
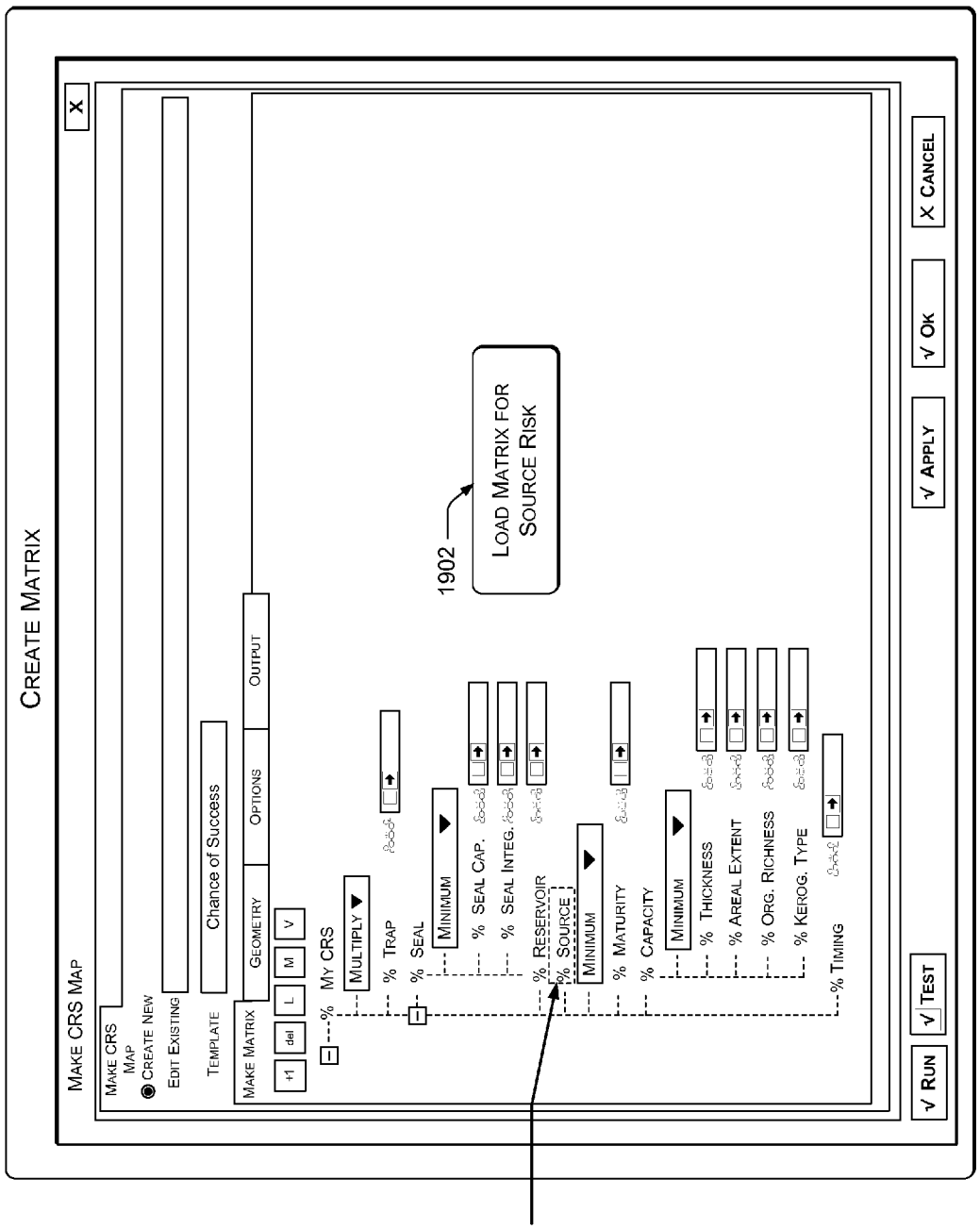
FIG. 19 is a diagram of an example user interface showing an option for loading a pre-made matrix.
Figure 20:
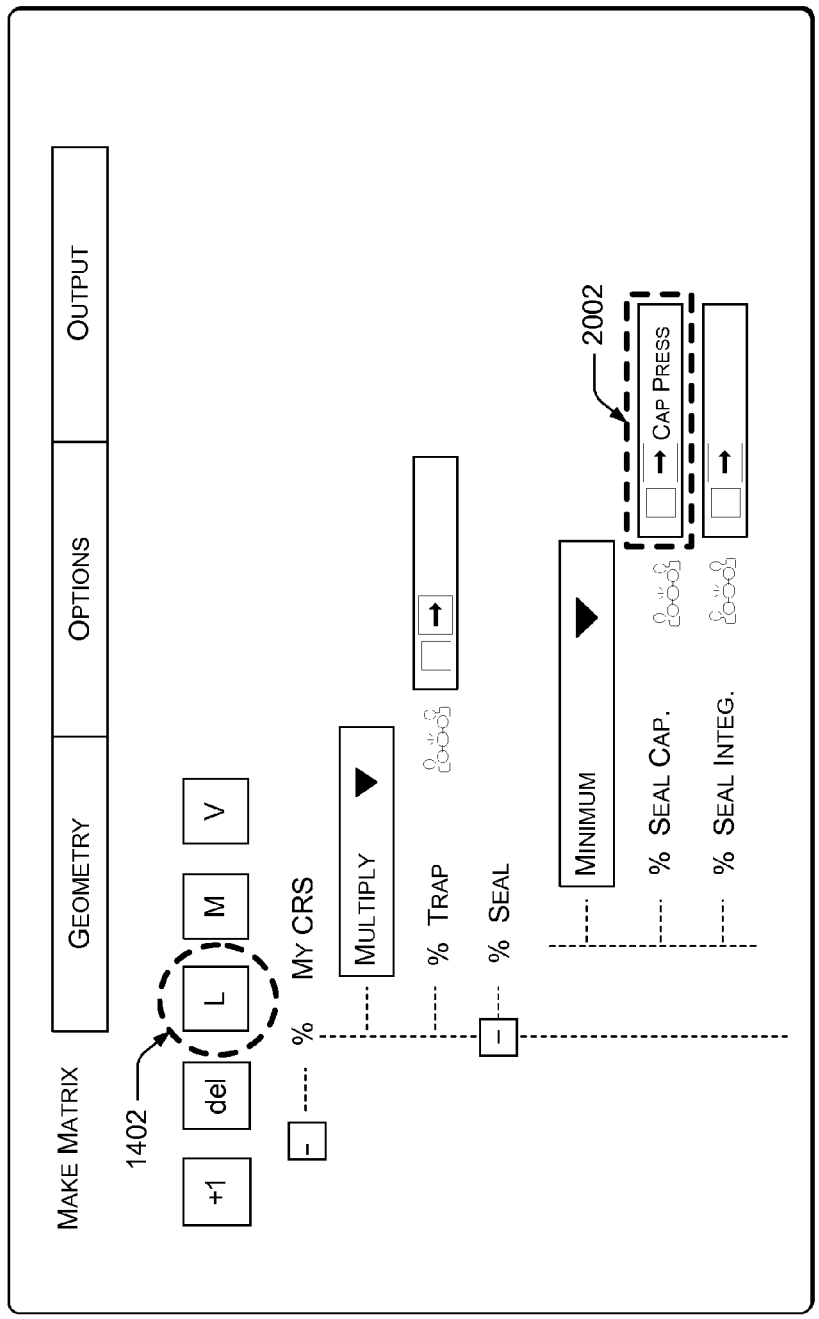
FIG. 20 is a diagram of an example user interface showing how to input a play-fairway map 122.

FIGS. 15-20 show the example user interface 146 in various states of interaction with a user during creation of an example matrix 200. Possible inputs for individual risk maps 152 may include play-fairway maps 122, a value, or another risk matrix. The matrix builder 112 enables the user to add in a number of other play-fairway maps 122 as well as values or possibly another pre-made matrix. In FIG. 15, instruction 1502 may show the user how to create submaps for an active map. In FIG. 16, example instructions 1602 may guide the user in renaming a map or deleting an active map. In FIG. 17, example instruction 1702 may guide the user in activating a particular map 122 in a part of the matrix 200 and adding submaps to the activated map 122. In FIG. 18, example instructions 1802 and 1804 may guide the user in selecting views and operators and may offer options for renaming maps 122. In FIG. 19, example instructions 1902 may guide a user in loading a pre-existing matrix 200 or map 122. FIG. 20 shows controls 1466 & 2002 for inputting (linking 1466) a play-fairway map 122, for example.

Figure 21:
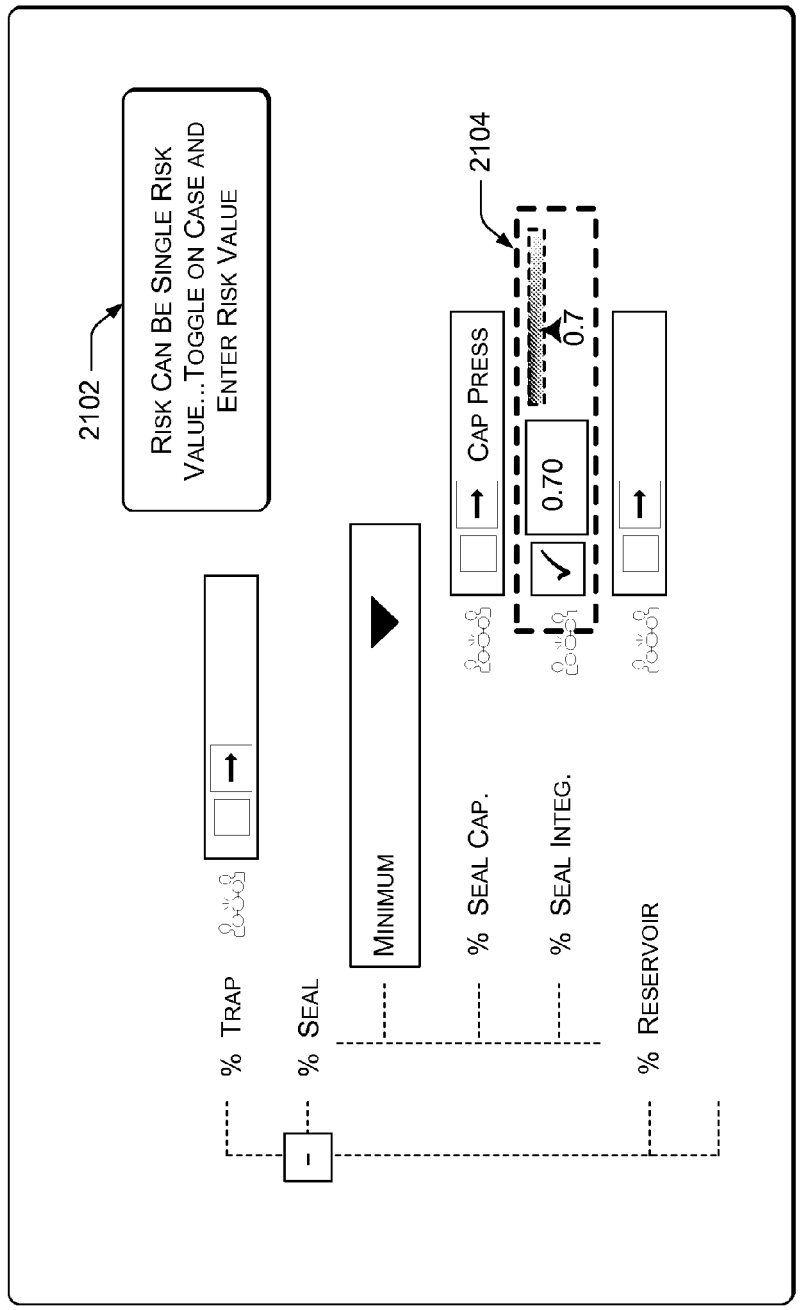
FIG. 21 is a diagram of an example user interface showing input of a single value via typing or scaling on a visual slider.

FIG. 21 shows instructions 2102 for entering (e.g., via load icon 1468) a single value number by typing each entry, or by entry through other user input components, such as scaling on a scale bar or slider 2104.

Figure 22:
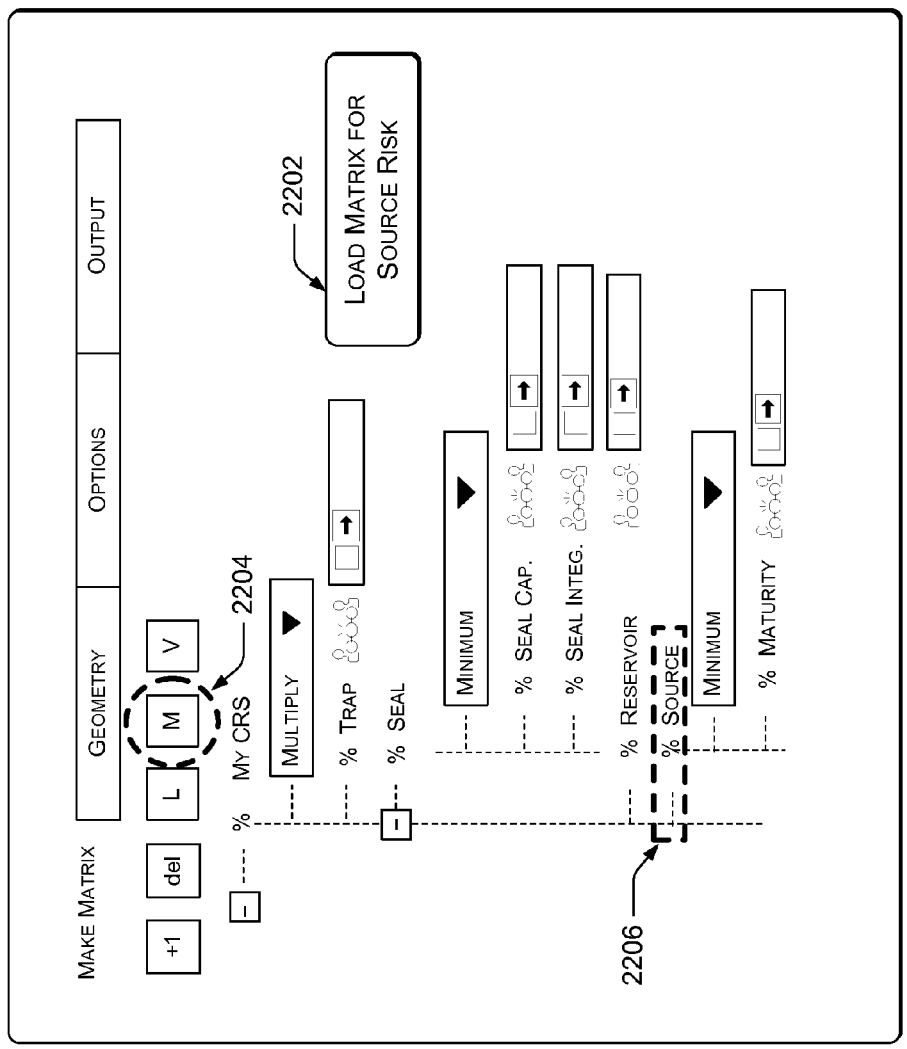
FIG. 22 is a diagram of an example user interface showing how to link a pre-existing risk map and/or a play-fairway map 122.

FIG. 22 shows instructions 2202 and controls 2204 & 2206 for entering another risk matrix: for example, by loading a pre-existing matrix, e.g., a risk map and/or a play-fairway map 122.

In an example implementation, the user can load to a simulator program, such as a PETREL project, a pre-existing CRSM matrix. This can be loaded to another CRSM matrix to be edited or used within that matrix. For example, a geologist may have performed a CRSM matrix on some geological parameters, and a petroleum systems expert may have produced a CRSM matrix based on the petroleum systems elements. Another geoscientist may now wishes to combine these two together into one risk map 152 which includes both risk maps 152.

When loading 1468 a matrix 200 the user may have the choice to include the matrix 200 or also the play-fairway maps 122 which created that matrix and the links between them.

There can be clear visual definition between risk maps 152 and play-fairway maps 122, using either a color scheme in the matrix 200, or other identifiers.

Example User Interface for Creating Dynamic Links

Figure 23:
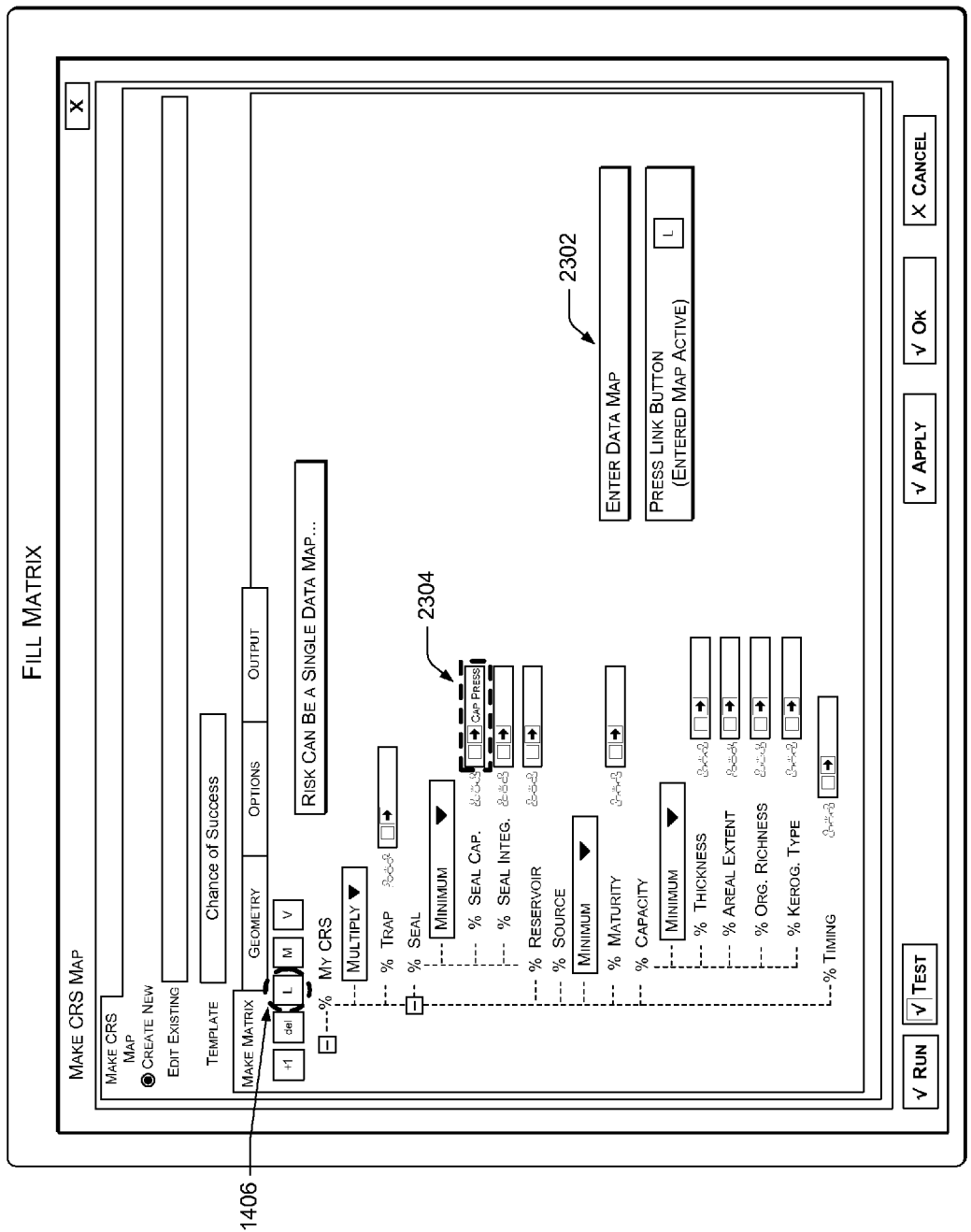
FIG. 23 is a diagram of an example user interface showing how to create a link between an input map and a desired risk map.

FIG. 23 shows instructions 2302 and controls 1466 & 2304 for creating a dynamic link between input data, such as an input map 122, and a desired chance map 152. First, geologic or play-fairway maps 122 are entered into the risk matrix 200. The user enters a data map 122, and then actuates the "link" icon 1466 or button. The dynamic link between input geologic data and the resulting chance map 152 is also referred to as a data-to-chance or a "data-to-risk" link that is accomplished by a transform 110, also called a data-to-risk transform 110.

Figure 24:
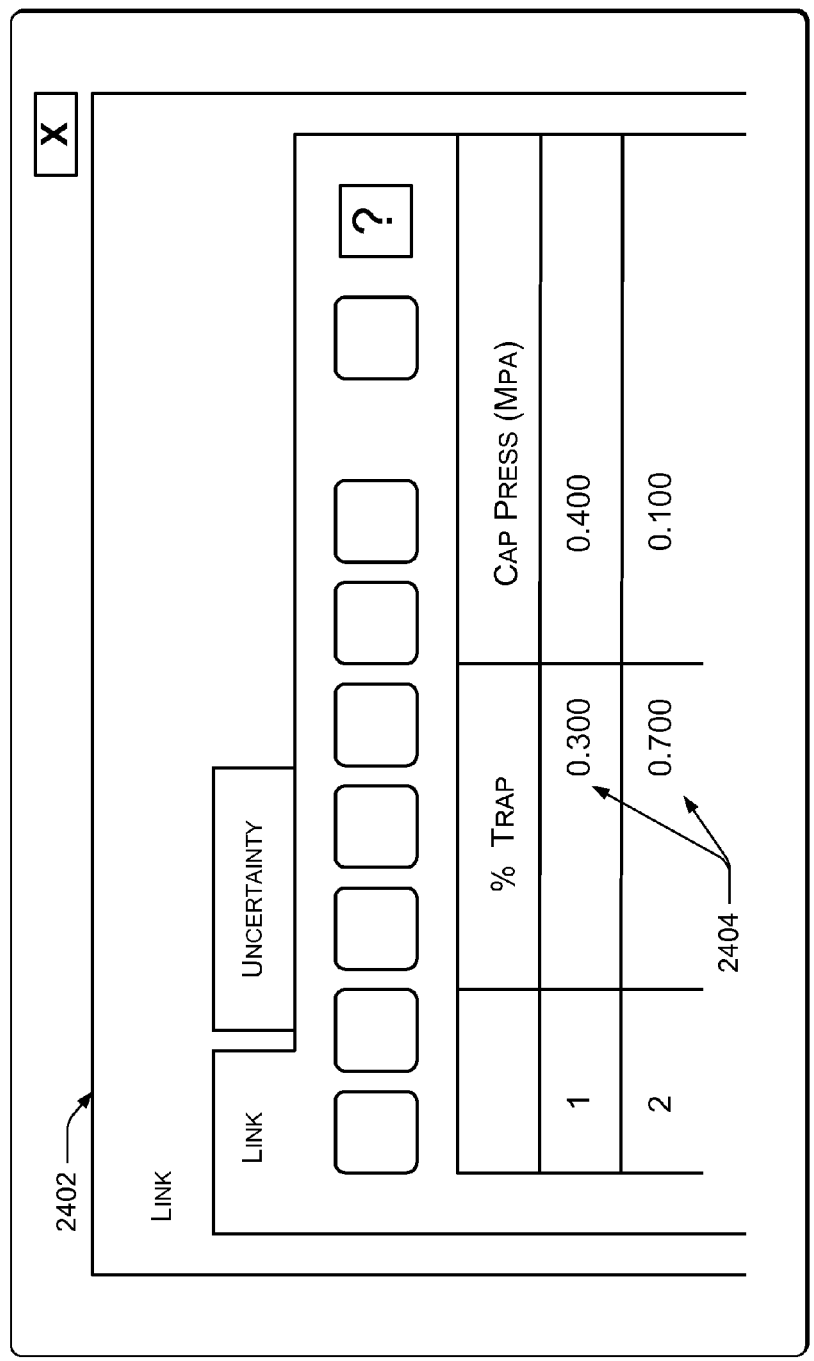
FIG. 24 is a diagram of an example user interface showing how to specify a transform through a table format.

As shown in FIG. 24, to create a risk map 152, the user may specify how the values in the play-fairway map 122 are used to create the risk map 152. That is, a transform 110 may be entered, for example through a table format, by actuating a transform link icon or button. This can be done in a separate window 2402 which opens when the link button 1466 is selected. Here, in the newly opened window 2402, the user can specify the play-fairway values and the risk map 152 values for the upper and lower limits of risk. The units for the risk map 152 may be between 0 and 1 as example range values 2404. The user can reduce these range boundaries (for example, to between 0.3 and 0.7 if little is known about the area). Values between these end points may then be scaled.

Figure 25:
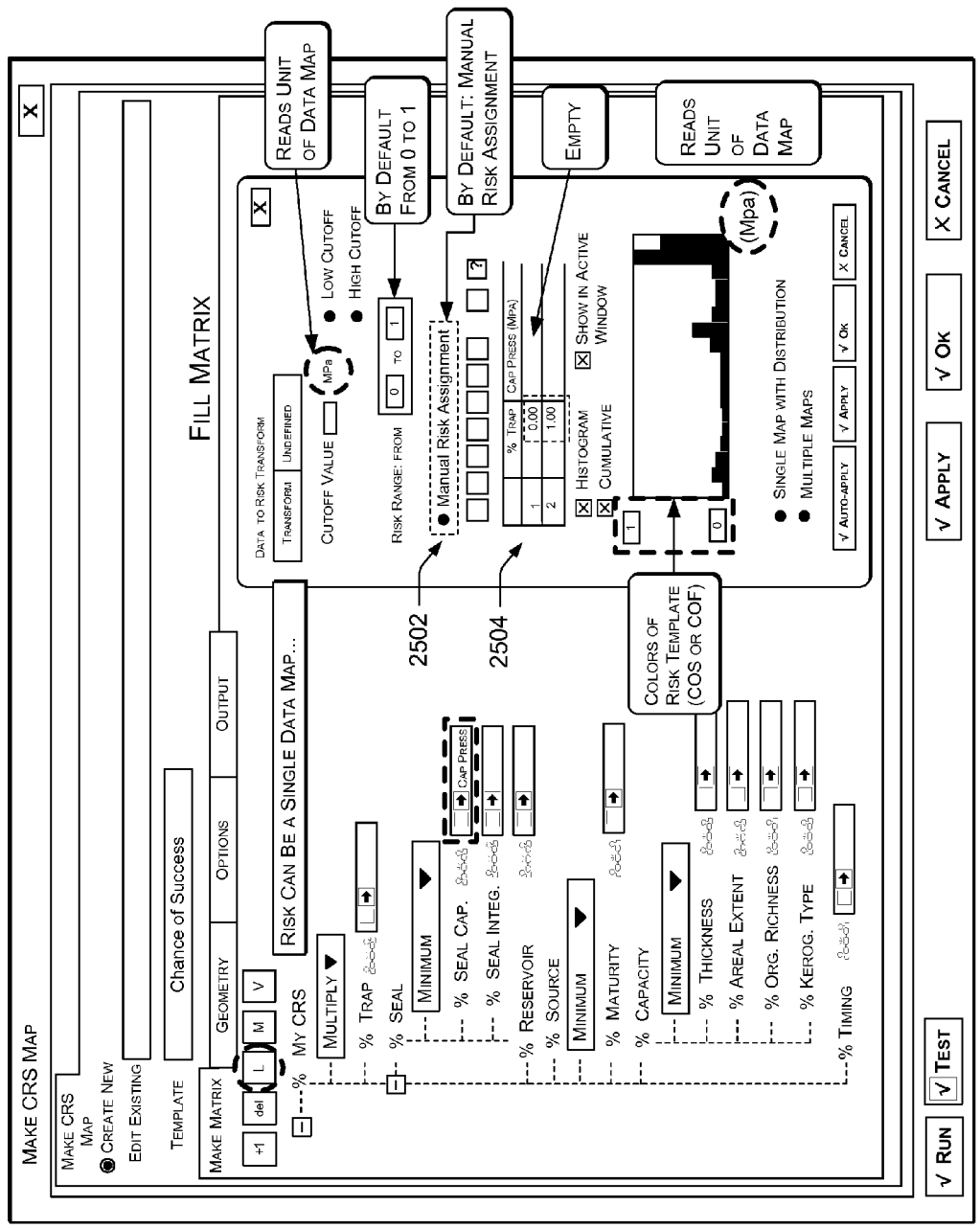
FIG. 25 is a diagram of an example user interface showing entry of matrix values.
Figure 26:
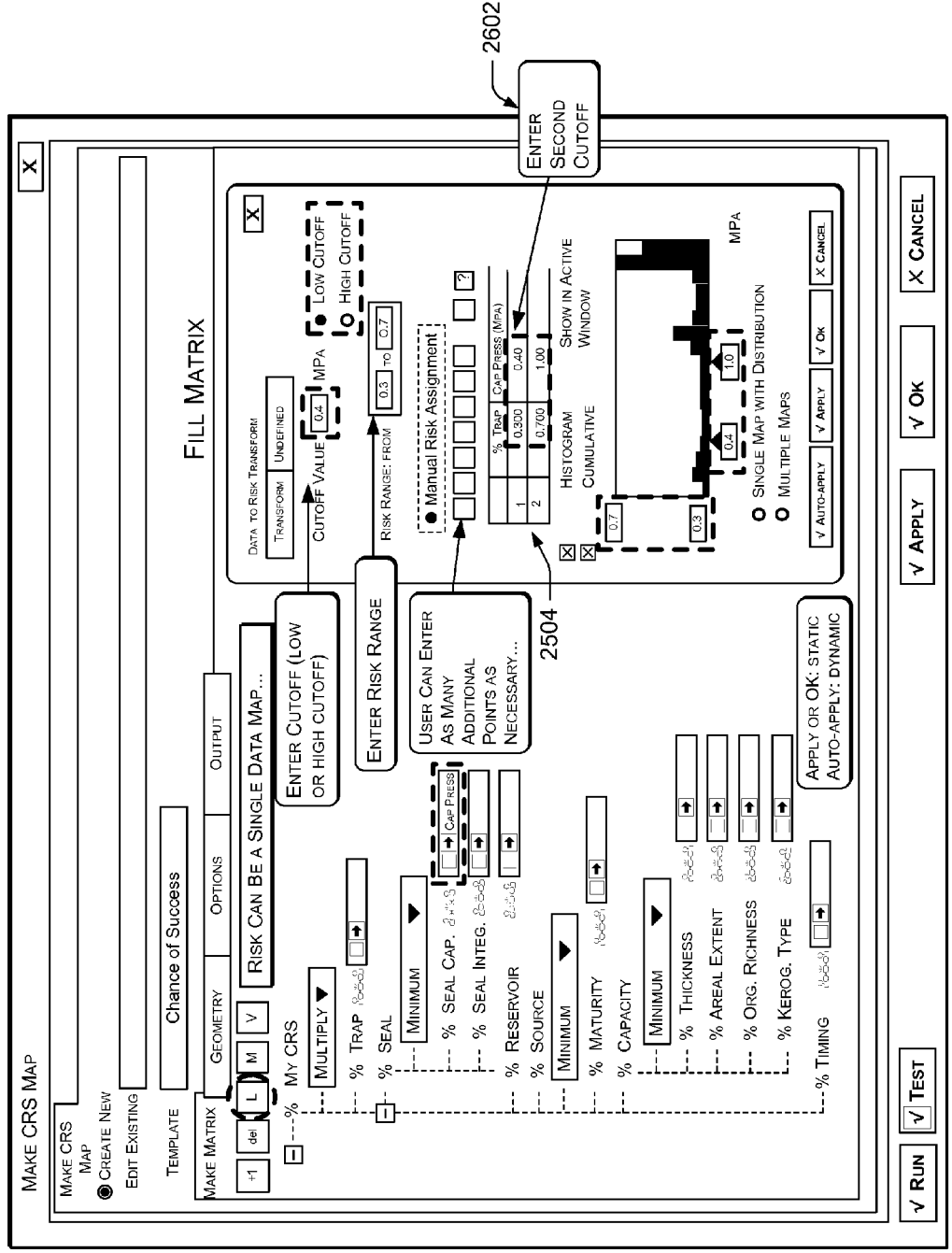
FIG. 26 is a diagram of an example user interface showing entry of matrix values.

As shown in FIGS. 25-26, the user may enter a cutoff value for creating a transform 110 and select whether the input value is the upper or lower cutoff. The user may then select the output risk range which, in an example implementation, by default may be between 0 and 1. The default option may include a manually entered transform 2502 which shows the table of data 2504 entered (risk value and cutoff value). Then, in FIG. 26, the user can enter the final cutoff value 2602 in the table 2504 and can edit the table 2504 further if desired.

Figure 27:
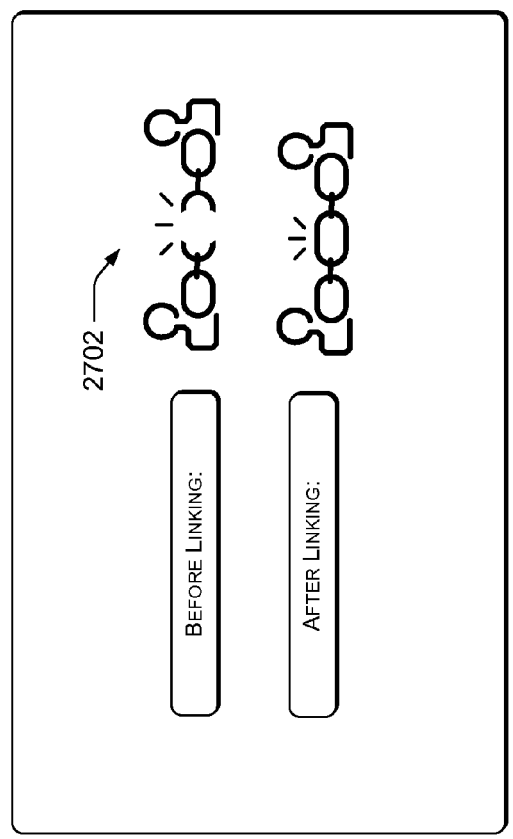
FIG. 27 is a diagram of an example user interface showing a linkage indicator to show when maps are dynamically linked.

FIG. 27 shows an example visual indicator 2702 showing the existence or nonexistence of a current (successful) link between risk map 152 and play-fairway maps 122 via the created transform 110. Before the link has been created between the play-fairway maps 122 and risk map 152, the link may be evident in the indicator with a dashed or broken line or other representative graphic. In an example embodiment, once the link has been established between the play-fairway maps 122 and the risk map 122, the presence of the successful link may be made evident by a solid line or other representative graphic, and colors may also change when the maps (122 & 152) are linked or not linked.

Figure 28:
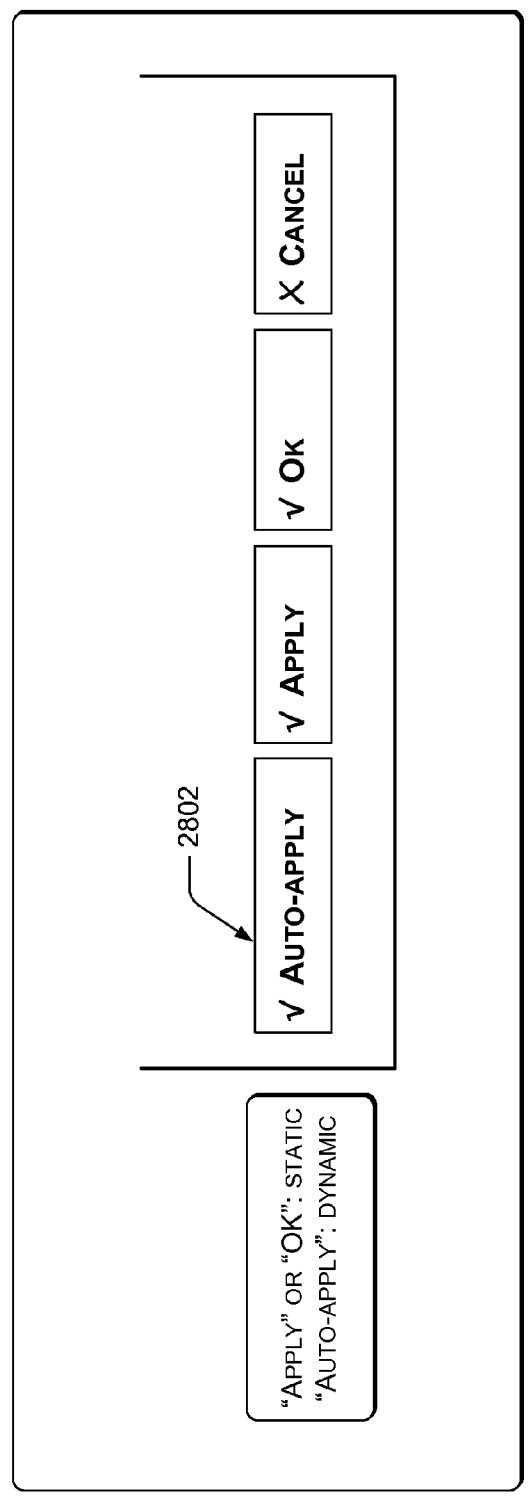
FIG. 28 is a diagram of an example user interface showing a control for activating automatic updating between maps.

FIG. 28 shows an example options tab segment of the user interface 146 for actuating a dynamic, real time option 2802. This allows the user to specify if changes to the input will be dynamically updated, with associated warning messages. In an example implementation, the user can change any of the values in the transform link window and may not have to actuate the "apply" or "OK" icons 2802 for consequent changes to take effect and to be saved into the CRSM matrix. In an example implementation, the changes may be applied automatically and saved, as though the user had pressed an "OK" button for the transform tab and the "OK" button for the entire process. In an example implementation, this option is available after the CRSM process has been run once.

Figure 29:
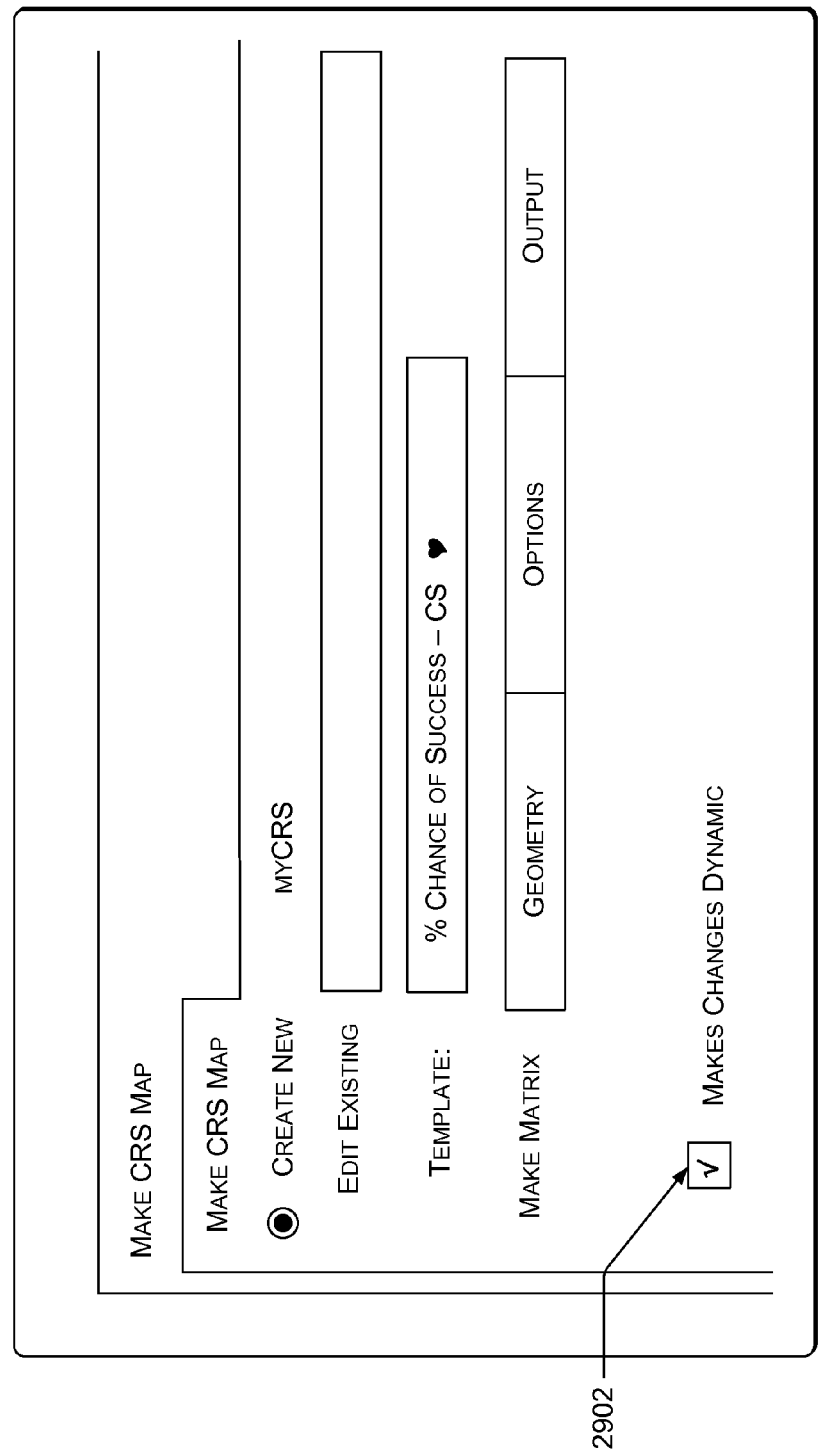
FIG. 29 is a diagram of an example user interface showing an alternate method of linking maps for real time updating.

FIG. 29 shows an alternative example of an auto-apply or "make dynamic" option 2902 on a user interface 146. After checking an option selector 2902, value changes to play-fairway maps 122 are applied directly to the final risk map 152. In an example embodiment, the process window has to be open for this alternative to apply. An advantage of such a dynamic linking process may be that the input maps 122 and resultant risk maps 152 stay linked and can be updated if input data changes.

Outputting a Chance Map and Risk Matrix

Figure 30:
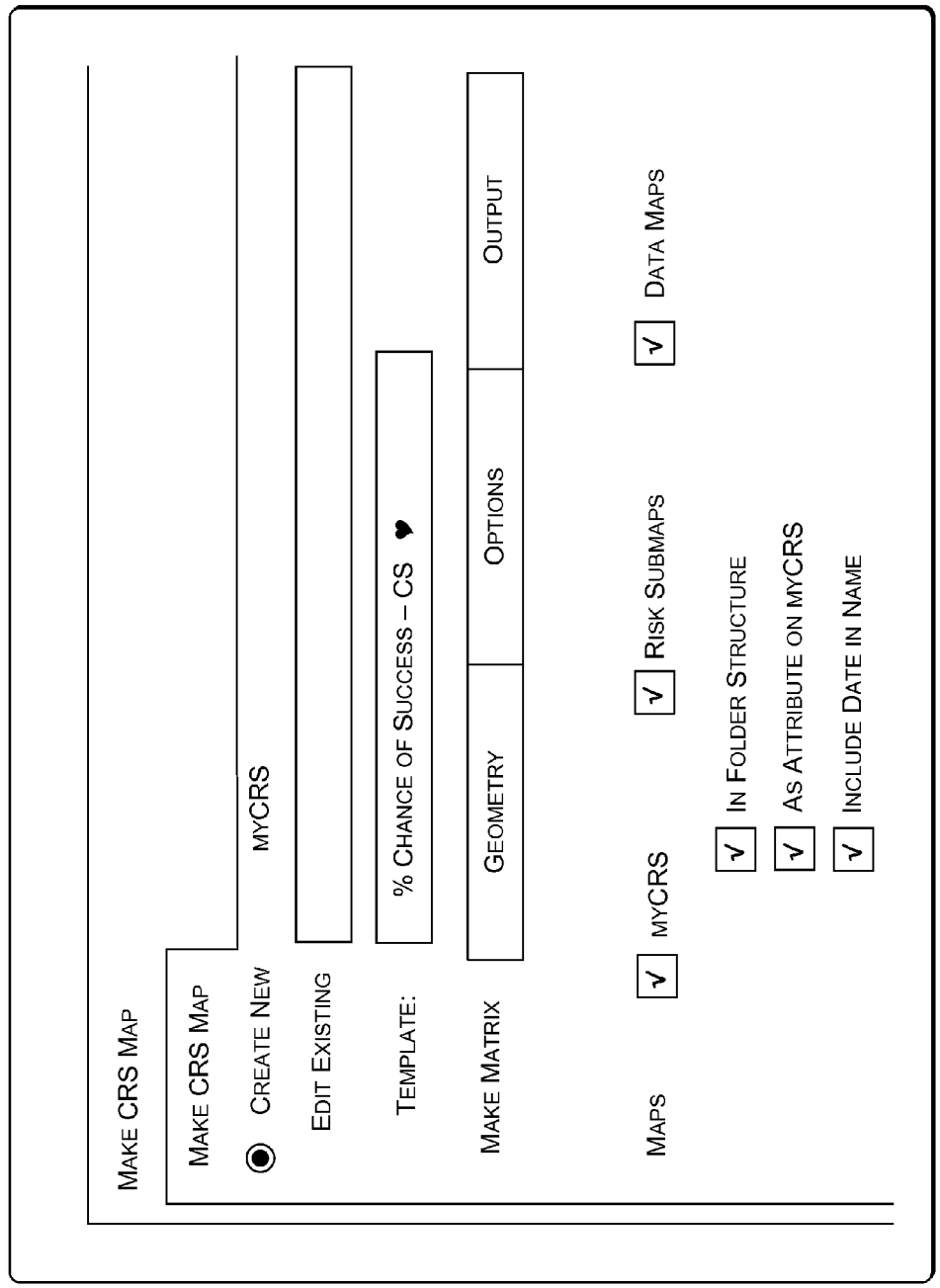
FIG. 30 is a diagram of an example user interface showing output options.

FIG. 30 shows example output options selection. For output options, such as matrix 200 output for use as input elsewhere, e.g., at an input tab of the user interface 146, users can transfer matrices 200 to other projects, add them into new matrices 200, or edit and re-run them. For output of risk maps 152 to the input tab of the user interface 146, these can be output as attributes on the risk map 152 or as maps 152 within a folder structure mirroring the matrix 200: the user can choose the level of the output maps 152. In an example embodiment, a JPEG of the matrix 200 can be output (from the domain-specific matrix icon). The user can add a date into the output. A user-input area of interest (AOI) polygon object used to sample the average from the maps 122 can also be output (e.g., from the settings dialog of an output risk map 152).

In an example implementation, the JPEG output may be by the first tab (create matrix), with an image of the input names and maps 122 and calculations between them. Additionally the numbers used to create the link between the input map 122 and the output data map 152 can be included.

Example User Interface for Uncertainty Assessments

Figure 31:
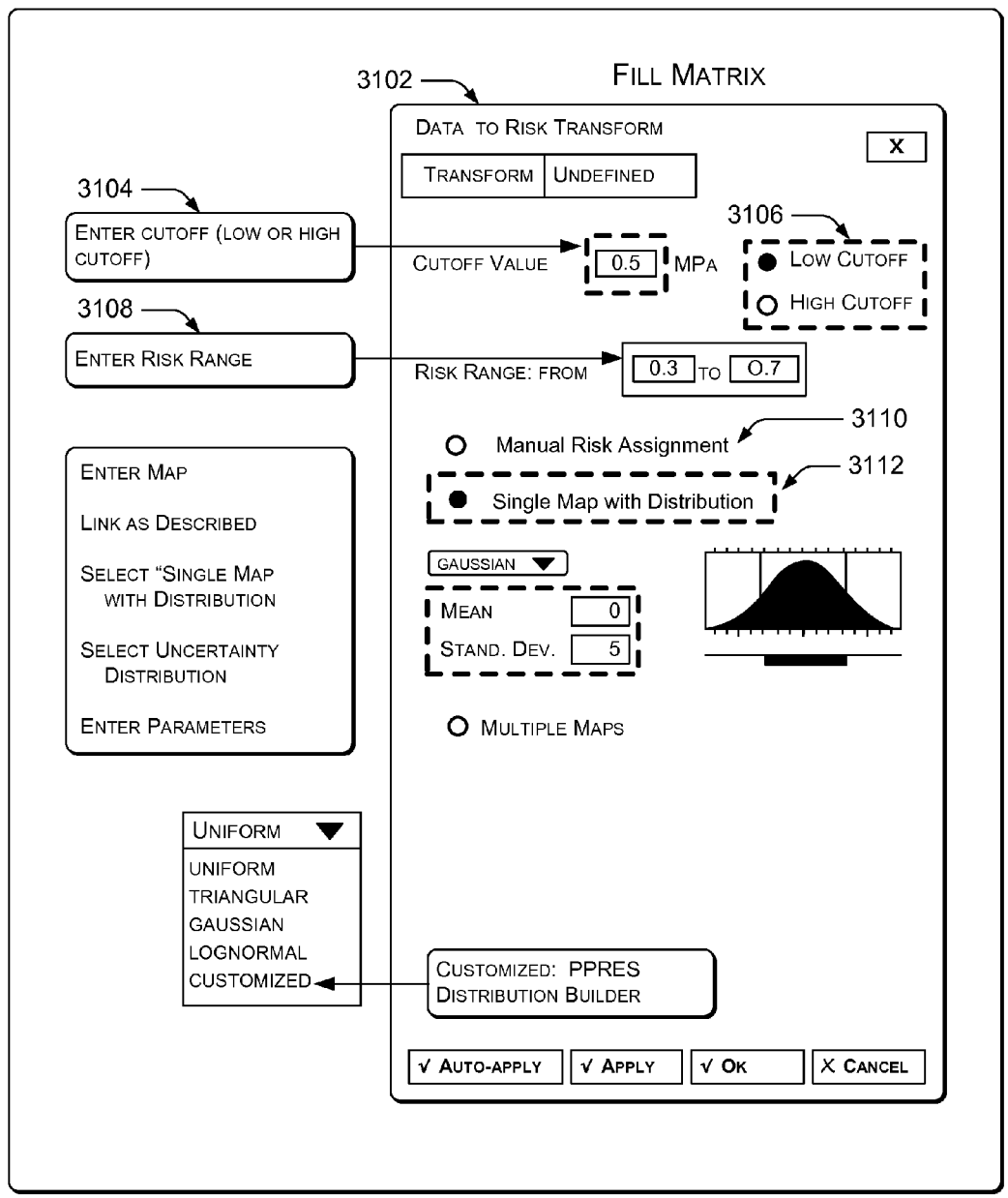
FIG. 31 is a diagram of an example user interface showing selection of uncertainty options for a single map.

Referring to FIG. 31, in an example user interface 146 for controlling a data-to-risk transform 3102, uncertainty assessment can be accessed, e.g., by selecting a row for specifying risk parameters and a relevant link. In an example implementation, a first tab may be provided with a link that defaults to a "no uncertainty assessment" setting. Otherwise, the user may enter the value for a cutoff 3104 for a transform 110 and select whether the entered value is a high or a low cutoff 3106. The user may then select the risk range 3108, which may default to a range of 0-1. In an example implementation, manual risk assignment 3110 is the default, in which the user enters the values for the input play fairway map 122 cutoffs.

In an example implementation, if the user then selects another method for risk assignment, uncertainty assessment can be included in the process. For example, uncertainty assessment can be included with generation of a single chance map 152 by selecting a customized distribution 3112.

FIG. 7 above shows a screenshot of an example user interface 146 for histogram building associated with uncertainty assessment.

Figure 32:
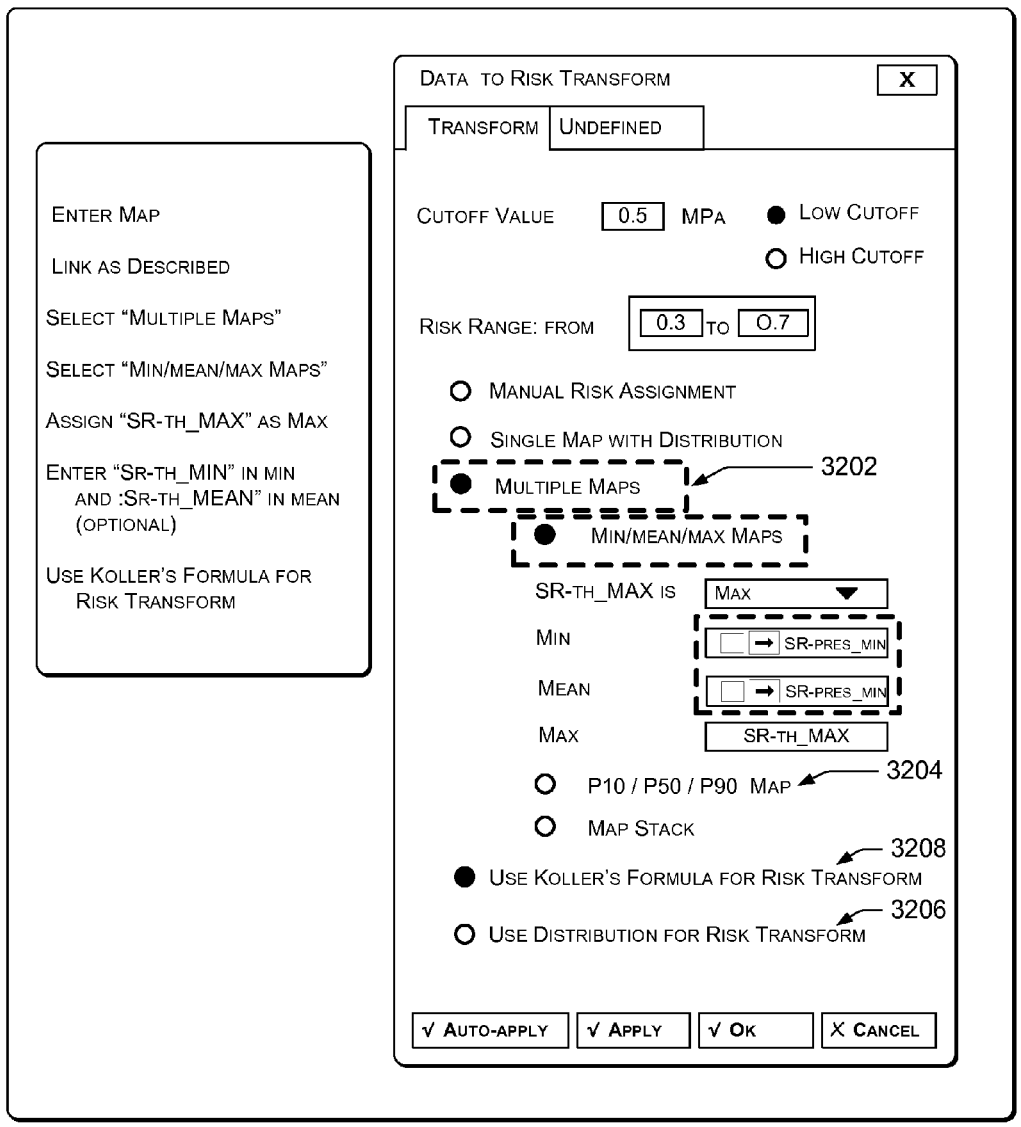
FIG. 32 is a diagram of an example user interface showing selection of uncertainty options for multiple maps.

As shown in FIG. 32, uncertainty assessment can be included with multiple maps 3202. Options may be provided for minimum, peak, and maximum or for P10, P50 and P90 defaults 3204. When a distribution is selected 3206, the user can also enter the distribution. Equation (1), described above (Koller's Formula 3208), may also be selected for a risk transform.

Figure 33:
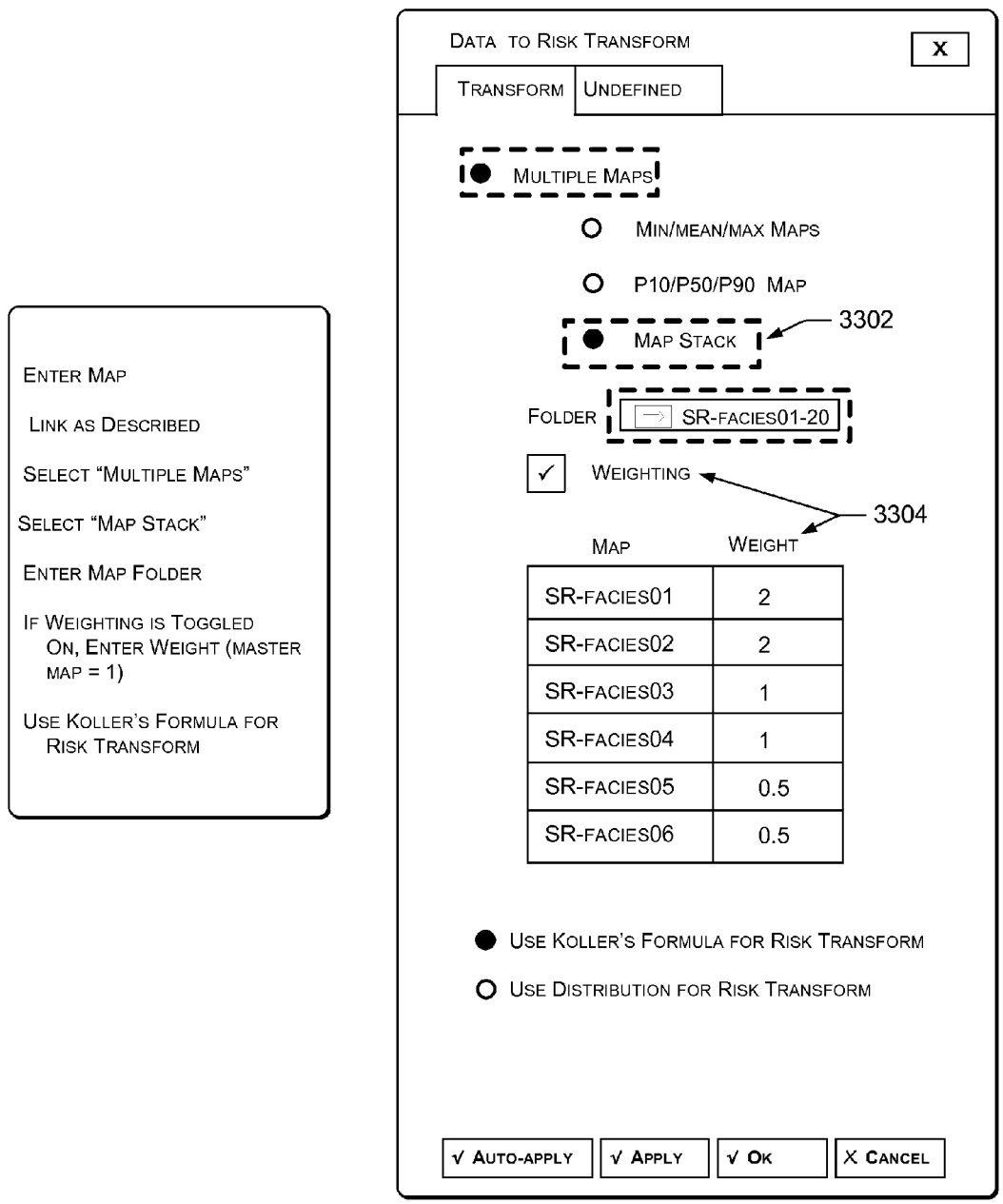
FIG. 33 is a diagram of an example user interface showing a map stack option, in which a user can enter a stack of maps within a folder and select a weighting factor which to skew the distribution.

FIG. 33 shows a user interface 146 for a map stack option 3302, in which the user can enter a stack of maps 122 within a folder. The user can also select a weighting factor 3304 which can favorably skew the distribution.

Test Option and Check for Errors

Figure 34:
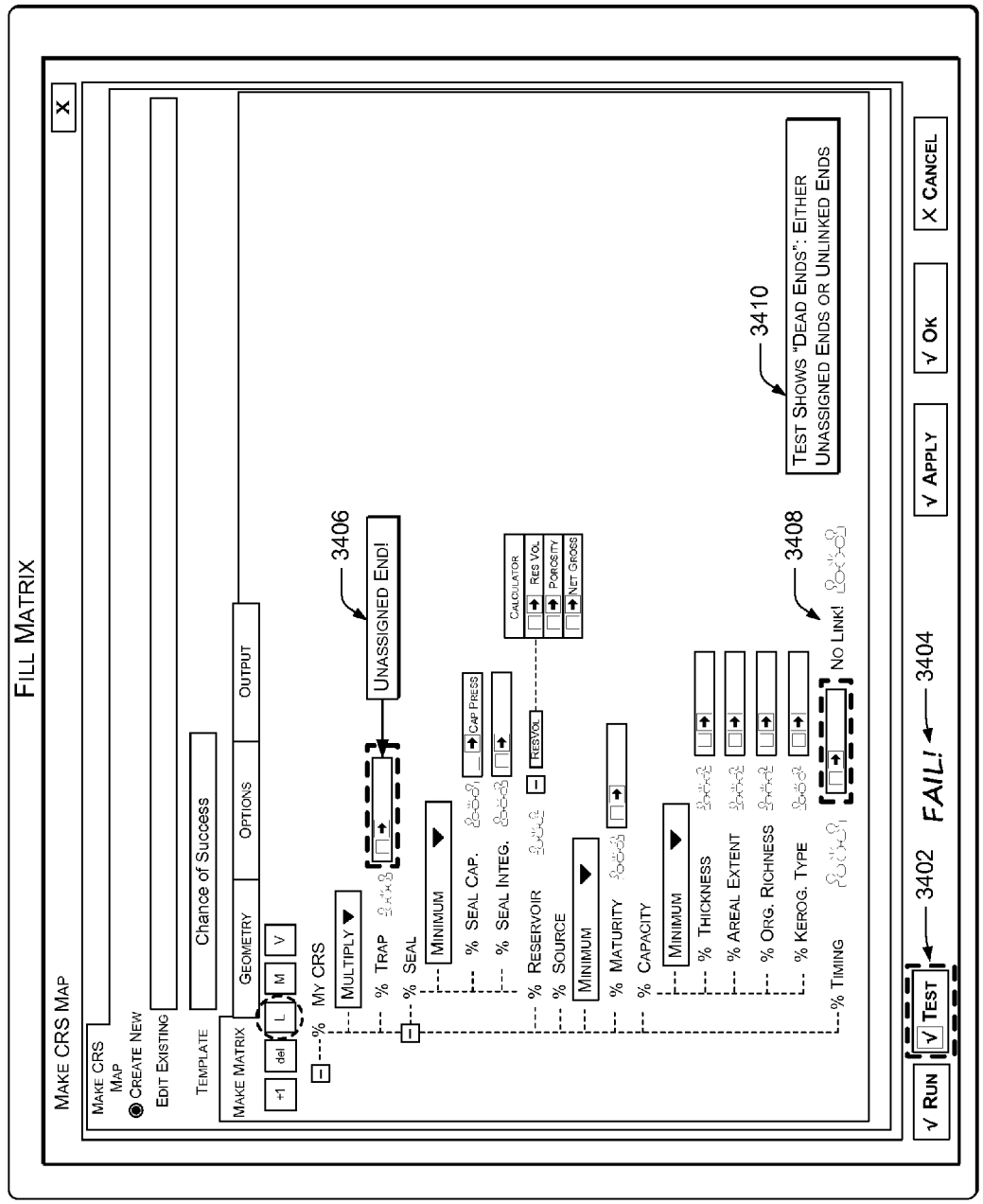
FIG. 34 is a diagram of an example user interface showing a test button to check if there are missing data maps or value entries and if there are current connections between the data maps and the risk maps.
Figure 35:
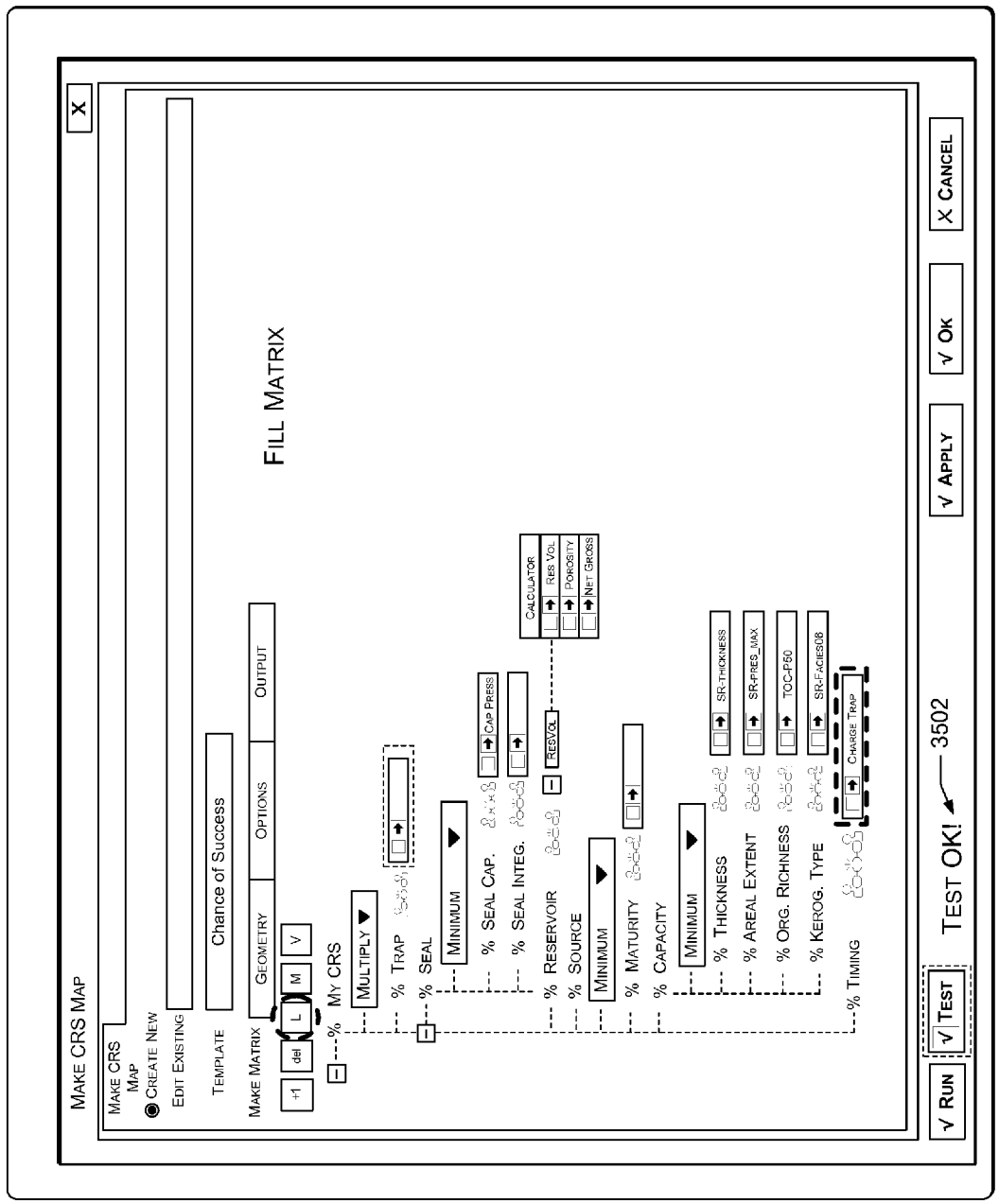
FIG. 35 is a diagram of an example user interface showing an example test result of the test in FIG. 34.

In an example implementation, shown in FIG. 34, the system includes a test option 3402 for the linking process to check whether there are any missing data maps 122 or missing value entries and whether there are current connections between the data maps 122 and the risk maps 152. If there are any detected problems then one or more fail indicators 3404 may be displayed and the problem line highlighted, or a text message in a text dialog box 3406 & 3408 & 3410 may appear showing the nature of the problem and at which line the error occurs. FIG. 35 shows a "test okay" result for the check described above for FIG. 34.

Example Methods

FIG. 36 shows an example method 3600 of creating a live chance of success map 152. In the flow diagram, the operations are summarized in individual blocks. The example method 3600 may be performed by hardware or combinations of hardware and software, for example, by the example system or the example mapping tools 100.

At block 3602, a property of a geologic map 122 is dynamically linked to a real time rendering of a chance of success map 152.

At block 3604, the chance of success map 152 is updated in real time when a value of the property changes in the geologic map 122.

FIG. 37 shows an example method 3700 of capturing geological properties to generate a live chance of success map 152. In the flow diagram, the operations are summarized in individual blocks. The example method 3700 may be performed by hardware or combinations of hardware and software, for example, by the example system or the example mapping tools 100.

At block 3702, a geologic map 122 is displayed.

At block 3704, navigation and selection of an area of the geologic map 122 is enabled.

At block 3706, geologic property values from a user-selected area of the geologic map 122 are entered into a distribution for generating a live chance map 152.

FIG. 38 shows an example method 3800 of merging multiple geological grids into a single grid of chance of success values. In the flow diagram, the operations are summarized in individual blocks. The example method 3800 may be performed by hardware or combinations of hardware and software, for example, by the example system or the example mapping tools 100.

At block 3802, multiple grids are received, each grid modeling a different set of coefficients for a geologic property of the same geological prospect. The multiple grids that are received may model different geological properties, instead of different coefficients of the same geological property.

At block 3804, the multiple coefficients (or multiple geological properties) associated with corresponding grid nodes of the received multiple grids are transformed into a single chance of success value for each individual grid node. The single chance of success value for each grid note provides a single chance map from the multiple received geological maps. Chance of failure may be used instead of chance of success.

CONCLUSION

Although example systems and methods have been described in language specific to structural features and/or methodological acts, it is to be understood that the subject matter defined in the appended claims is not necessarily limited to the specific features or acts described. Rather, the specific features and acts are disclosed as example forms of implementing the claimed systems, methods, and structures.

The invention claimed is:

1. A computer-executable method performed by a computer system, the method comprising:
dynamically linking a geologic data source to a chance map via a transform;
updating the chance map in real time when a change occurs in the data source; and
generating an uncertainty assessment of one or more parameters of the chance map in real time based on data from the geologic data source, wherein generating the uncertainty assessment comprises determining an uncertainty of the one or more parameters based on a distribution of property values in at least a portion of the geologic data source.

2. The computer-executable method of claim 1, wherein the geologic data source comprises a geologic map and generating the uncertainty assessment comprises populating the distribution of values for mapping the uncertainty with property values from the geologic map.

3. The computer-executable method of claim 2, further comprising representing the distribution of property values from the geologic map with a histogram.

4. The computer-executable method of claim 3, further comprising performing a Monte Carlo simulation using the distribution of property values or the histogram.

5. The computer-executable method of claim 4, further comprising extending a user interface for at least one of modifying the histogram, specifying uncertainty cutoff values, or for specifying minimum, peak, and maximum property values for mapping uncertainty.

6. The computer-executable method of claim 5, further comprising determining a histogram shape based at least partially on input received using the user interface.

7. The computer-executable method of claim 6, wherein geological map input is used for one, two or all three of minimum, peak, and maximum property values from the geological map; and
wherein user-entered numeric data is used in combination with geological map input to shape the histogram.

8. The computer-executable method of claim 6, further comprising updating the histogram in real time upon receiving a user-initiated parameter change.

9. The computer-executable method of claim 2, further comprising extending a user interface to select the one or more property values from the geologic map to populate the distribution of values.

10. The computer-executable method of claim 9, wherein the user interface enables the user to designate an area on the geologic map and to drag-and-drop the one or more property values from the designated area of the geologic map to a data input on the user interface for building the distribution of property values.

11. The computer-executable method of claim 10, further comprising automatically deriving average minimum, average peak, and average maximum property values from the area of the geologic map dragged-and-dropped by the user.

12. The computer-executable method of claim 1, wherein generating the uncertainty assessment in real time is based solely on data from the geologic data source without user input of a statistical datum including one of mean, standard deviation, variance, kurtosis, or skewness.

13. The computer-executable method of claim 1, further comprising generating an uncertainty map representing the uncertainty assessment and imposing the uncertainty map on a corresponding geological map.

14. A system, comprising:
a processor;
a memory;
a storage medium;
a mapping engine residing in the storage medium for performing a process, including:
dynamically linking a geologic map to a chance map via a transform; and
updating the chance map in real time when a change occurs in the geologic map; and
an uncertainty engine to generate an uncertainty assessment of one or more parameters of the geologic map based on data from the geologic map, wherein an uncertainty of the one or more parameters is determined using the uncertainty engine, based on a distribution of property values in at least a portion of the geologic map.

15. The system of claim 14, further comprising a distribution builder to populate a distribution of values for mapping the uncertainty with property values from the geologic map.

16. The system of claim 15, wherein the distribution builder generates a user-customizable histogram of property values from the geologic map.

17. The system of claim 15, further comprising a user interface manager to enable a user to designate an area on the geologic map and to drag-and-drop the property values from the designated area of the geologic map into the distribution builder for generating the distribution of values.

18. A computer-executable method, comprising:
receiving multiple grid maps each modeling a different set of coefficients for a geologic property of an exploration prospect; and
transforming the multiple coefficients associated with coincident grid nodes of the multiple grids into a single chance value for each individual grid node, wherein transforming comprises applying an equation to the multiple coefficients of each grid node, wherein the equation relates a chance of success (COS) representing a chance of success at the given grid node, with a Cutoff representing a property value below which the exploration prospect is unsuccessful, a Minimum representing a property value delineating a range of property values in which the exploration prospect has a likelihood of being unsuccessful, and a Maximum representing a property value delineating a range of property values in which the prospect has a likelihood of being successful.

19. The computer-executable method of claim 18, wherein the equation comprises:

$$COS = 1 - ((Cutoff - Minimum)/Maximum);$$

and
wherein a corresponding chance of failure comprises the COS subtracted from 1.

20. The computer-executable method of claim 19, further comprising applying the equation to a stack of maps representing the exploration prospect.

* * * * *